United States Patent
Tamura et al.

(10) Patent No.: US 10,670,949 B2
(45) Date of Patent: Jun. 2, 2020

(54) PROJECTOR WITH ATTITUDE ADJUSTMENT APPARATUS

(71) Applicant: SEIKO EPSON CORPORATION, Tokyo (JP)

(72) Inventors: Tetsuya Tamura, Matsumoto (JP); Takuya Hatano, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/145,896

(22) Filed: Sep. 28, 2018

(65) Prior Publication Data

US 2019/0101811 A1    Apr. 4, 2019

(30) Foreign Application Priority Data

Sep. 29, 2017  (JP) ................ 2017-189826
Sep. 29, 2017  (JP) ................ 2017-189827

(51) Int. Cl.
| | | |
|---|---|---|
| *G03B 21/14* | (2006.01) | |
| *G03B 21/00* | (2006.01) | |
| *G03B 33/12* | (2006.01) | |
| *G03B 3/04* | (2006.01) | |

(52) U.S. Cl.
CPC ............ *G03B 21/142* (2013.01); *G03B 3/04* (2013.01); *G03B 21/006* (2013.01); *G03B 21/145* (2013.01); *G03B 21/147* (2013.01); *G03B 33/12* (2013.01)

(58) Field of Classification Search
CPC ...... G03B 3/04; G03B 21/145; G03B 21/147; G03B 21/28; G03B 33/12; G03B 21/005; G03B 21/006; G03B 21/142
See application file for complete search history.

(56) References Cited

U.S. PATENT DOCUMENTS

| | | | |
|---|---|---|---|
| 582,024 A | 5/1897 | Rimmington | |
| 610,976 A | 9/1898 | Schiönning et al. | |
| 5,800,032 A * | 9/1998 | Uchiyama | G03B 21/145 348/E5.141 |
| 5,876,105 A | 3/1999 | Rodriquez, Jr. | |
| 6,361,171 B1 * | 3/2002 | Ejiri | G03B 21/14 348/744 |
| 6,609,797 B2 * | 8/2003 | Ejiri | G03B 21/14 348/744 |
| 6,830,341 B2 * | 12/2004 | Ejiri | G03B 21/14 353/69 |

(Continued)

FOREIGN PATENT DOCUMENTS

| | | |
|---|---|---|
| JP | H7-293658 A | 11/1995 |
| JP | H11-153204 A | 6/1999 |

(Continued)

*Primary Examiner* — Bao-Luan Q Le
(74) *Attorney, Agent, or Firm* — Oliff PLC

(57) ABSTRACT

A projector includes a light source apparatus, an image formation apparatus that includes a light modulator and forms an image, the light modulator modulating light outputted from the light source apparatus, a projection optical apparatus that projects the image formed by the image formation apparatus, and an attitude adjustment apparatus that causes the light modulator to pivot around a pivotal axis perpendicular to the optical axis of the projection optical apparatus to adjust the attitude of the light modulator.

16 Claims, 25 Drawing Sheets

(56) References Cited

U.S. PATENT DOCUMENTS

| | | | | |
|---|---|---|---|---|
| 7,182,464 B2* | 2/2007 | Ejiri | ............ | G03B 21/14 348/E17.005 |
| 8,152,313 B2* | 4/2012 | Amano | ............ | G03B 3/00 348/745 |
| 8,220,937 B2* | 7/2012 | Amano | ............ | G03B 21/142 348/806 |
| 8,226,248 B2* | 7/2012 | Amano | ............ | G03B 21/142 353/101 |
| 2002/0089651 A1* | 7/2002 | Ejiri | ............ | G03B 21/14 353/69 |
| 2003/0206277 A1* | 11/2003 | Eiiri | ............ | G03B 21/14 353/31 |
| 2005/0062940 A1* | 3/2005 | Ejiri | ............ | G03B 21/14 353/69 |
| 2008/0180639 A1* | 7/2008 | Amano | ............ | G03B 21/142 353/24 |
| 2009/0279055 A1* | 11/2009 | Amano | ............ | G03B 3/00 353/101 |
| 2010/0171938 A1* | 7/2010 | Amano | ............ | G03B 21/142 353/119 |

FOREIGN PATENT DOCUMENTS

| | | |
|---|---|---|
| JP | 2000-508089 A | 6/2000 |
| JP | 2000-321661 A | 11/2000 |
| JP | 2004-45733 A | 2/2004 |
| JP | 2005-128370 A | 5/2005 |
| JP | 2008-83415 A | 4/2008 |
| JP | 2010-276895 A | 12/2010 |
| JP | 2015-90502 A | 5/2015 |

* cited by examiner

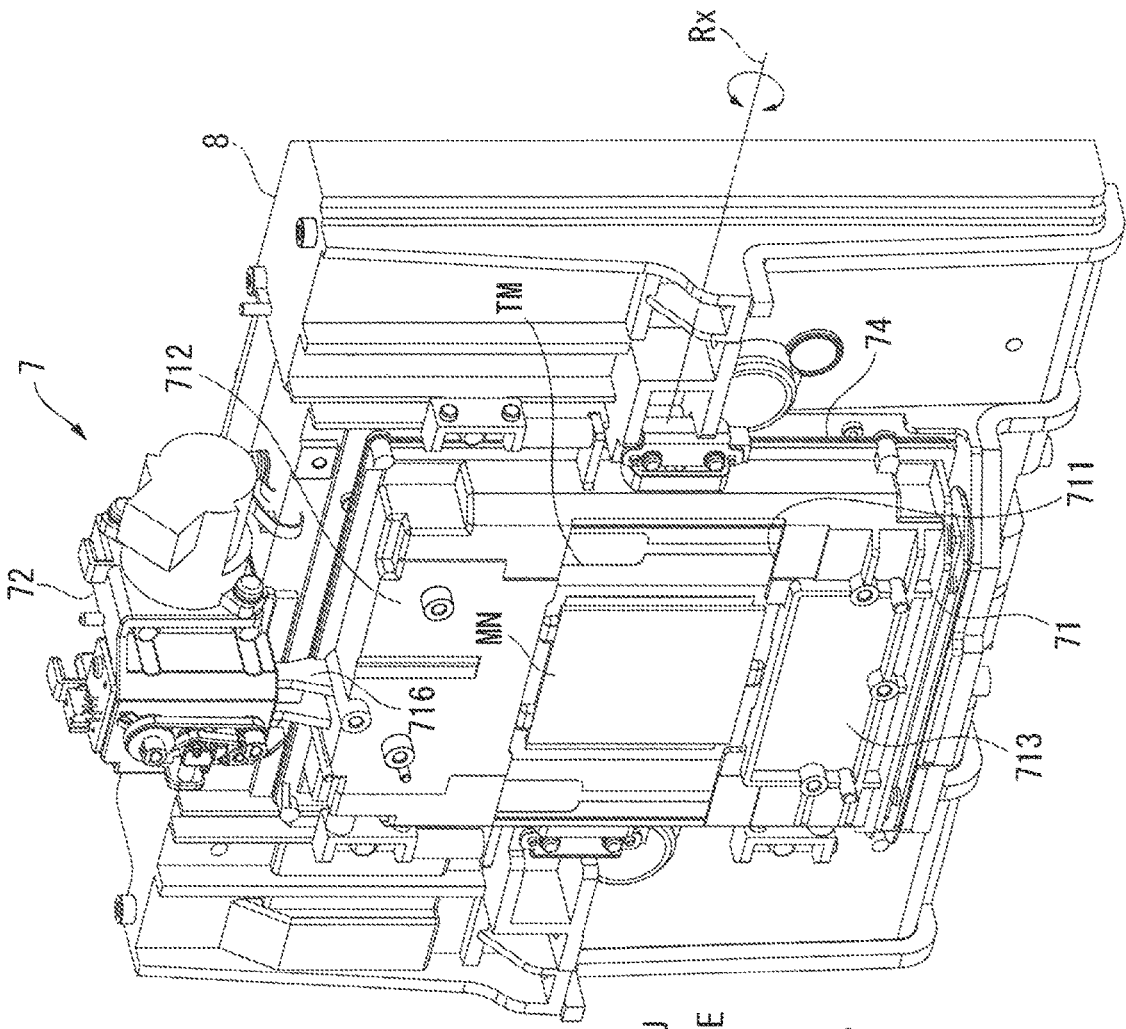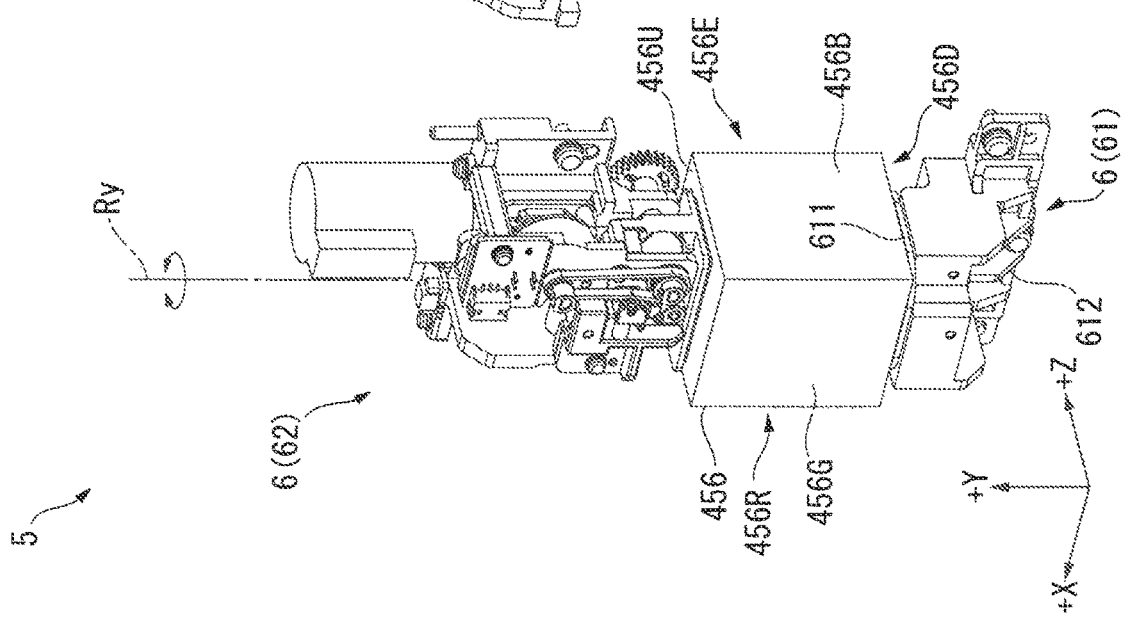

FIG.10
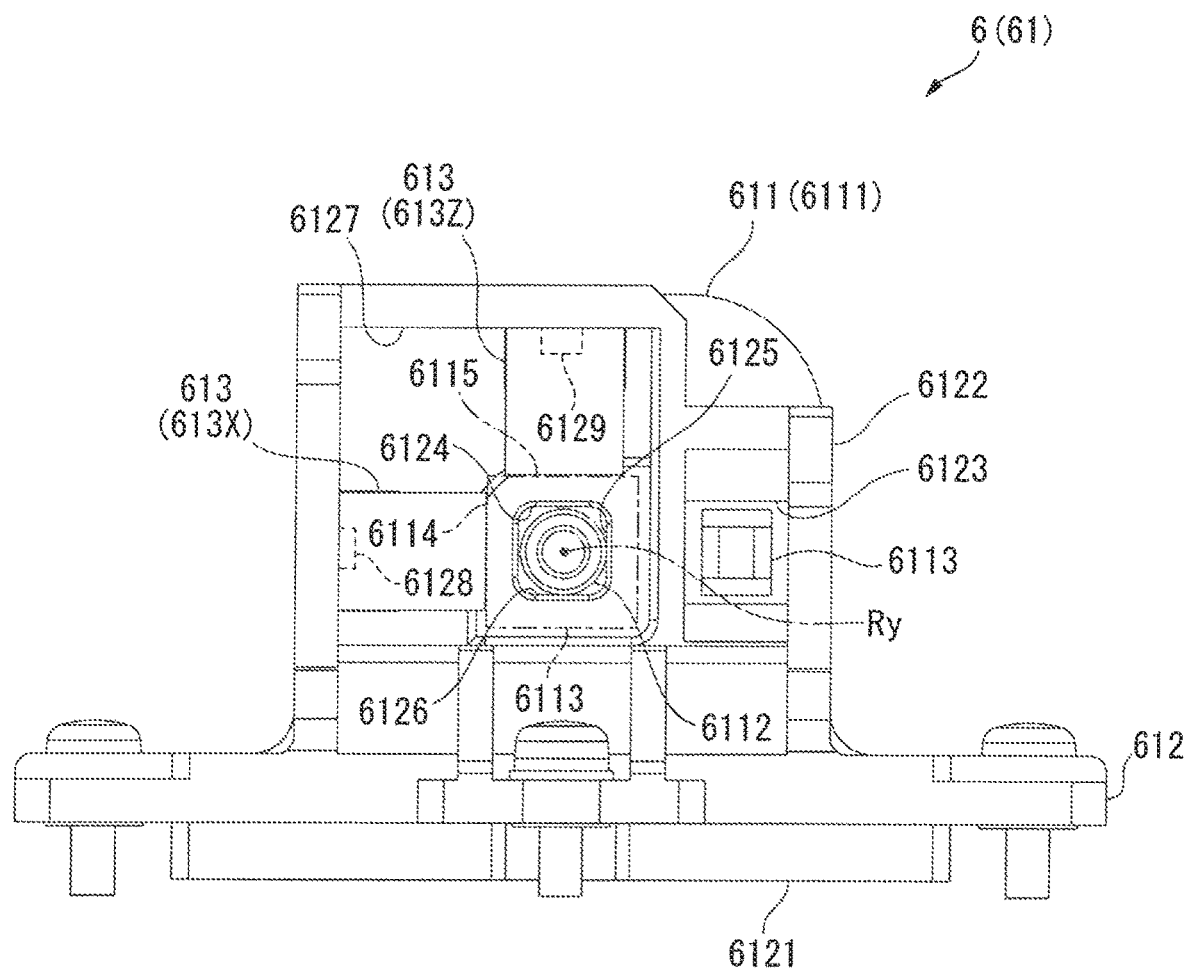
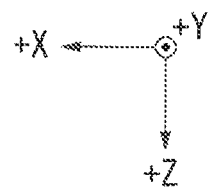

FIG.15
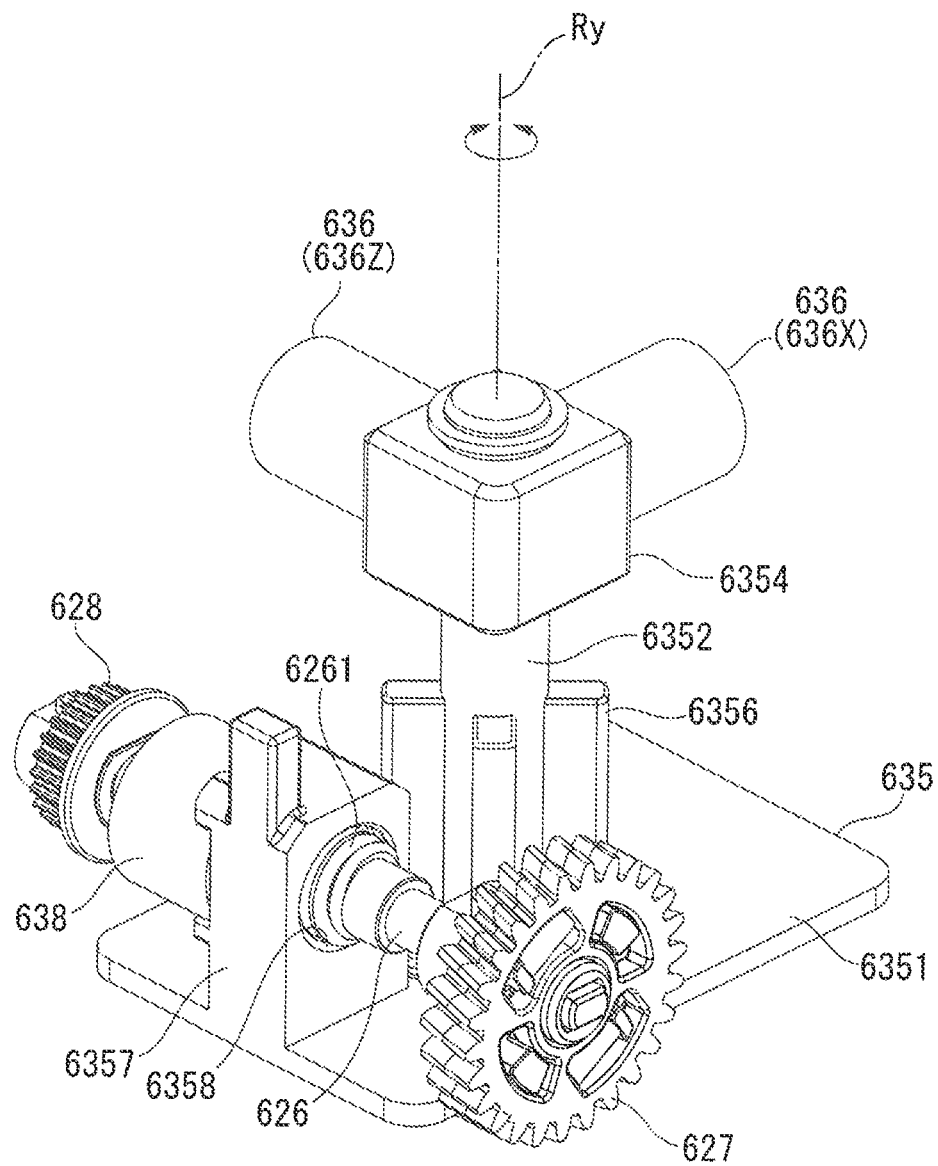
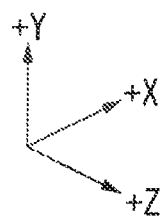

PROJECTOR WITH ATTITUDE ADJUSTMENT APPARATUS

BACKGROUND

1. Technical Field

The present invention relates to a projector.

2. Related Art

There has been a known projector including a light source apparatus, a light modulator that modulates light outputted from the light source apparatus to form an image according to image information, and a projection optical apparatus that enlarges and projects the formed image on a projection surface.

A liquid crystal panel exemplifies the light modulator employed in the projector.

There is also a known projector including a removable projection lens unit corresponding to the projection optical apparatus (see JP-A-2010-276895, for example).

Such a projector has a problem of degradation in a displayed image when the projection optical apparatus and the light modulator, such as the liquid crystal panel described above, are inappropriately arranged.

For example, the degradation in the image described above occurs when the relative arrangement of the projection optical apparatus and the light modulator is inappropriate, due, for example, to variation in assembly of the projector, component tolerance, deformation of the projection optical apparatus and the light modulator due to the weight of themselves, variation in temperature or any other factor of the environment in which the projector is used, detachment and reattachment of the projection optical apparatus, and a positional shift of the projection optical apparatus in the direction perpendicular to the optical axis thereof. In particular, if one of the projection optical apparatus and the light modulator inclines with respect to the other, what is called one-side defocus, which is a phenomenon in which a projected image has a defocus portion on at least any of the right, left, upper, and lower sides occurs. The higher the resolution of the displayed image, the more noticeable the one-side defocus.

To address the problem described above, it is conceivable to employ a mechanism that inclines the projection optical apparatus with respect to the light modulator. However, since the projection optical apparatus is relatively heavy, the mechanism is required to have high rigidity, which tends to result in increases in size, consumed electric power, weight, and manufacturing cost of the mechanism. Further, since the in-projector position of the projection optical apparatus is relatively close to the exterior of the projector, there is another problem of noise that is likely to leak out of the projector when an actuator inclines the projection optical apparatus.

SUMMARY

An advantage of some aspects of the invention is to provide a projector capable of suppressing degradation in a displayed image.

A projector according to an aspect of the invention includes alight source apparatus, an image formation apparatus that includes a light modulator and forms an image, the light modulator modulating light outputted from the light source apparatus, a projection optical apparatus that projects the image formed by the image formation apparatus, and an attitude adjustment apparatus that causes the light modulator to pivot around a pivotal axis perpendicular to an optical axis of the projection optical apparatus to adjust an attitude of the light modulator.

According to the configuration described above, the attitude adjustment apparatus can cause the light modulator to pivot around the pivotal axis perpendicular to the optical axis of the projection optical apparatus, whereby the attitude of the light modulator can be adjusted. The attitude (inclination) of the light modulator with respect to the projection optical apparatus can therefore be adjusted, whereby the light modulator can be positioned adequately for the projection optical apparatus. Occurrence of the one-side defocus described above can therefore be avoided, whereby deterioration of a displayed image can be avoided.

Further, since the thus configured attitude adjustment apparatus inclines the light modulator, which is lighter than the projection optical apparatus, the problems described above that occur when the projection optical apparatus is inclined can be avoided.

In the aspect described above, it is preferable that the image formation apparatus includes a plurality of the light modulators and a light combiner that is integrated with the plurality of the light modulators and combines light fluxes incident from the plurality of the light modulators with one another, and that the attitude adjustment apparatus causes the light combiner to pivot around the pivotal axis to adjust the attitudes of the plurality of the light modulators.

In the following description, the configuration in which the plurality of the light modulators are integrated with the light combiner is referred to as an image formation unit.

According to the configuration described above, since the attitude adjustment apparatus causes the image formation unit to pivot, the attitudes of the plurality of the light modulators integrated with the light combiner can be simultaneously adjusted. It is therefore easy to perform the attitude adjustment (inclination adjustment) of the light modulators, and the attitude adjustment can be readily performed as compared with a case where the attitude of each of the light modulators is separately adjusted.

In the aspect described above, it is preferable that the light combiner has a first light incident surface and a second light incident surface located on opposite sides of the light combiner, a third light incident surface that intersects the first and second light incident surfaces, and a light exiting surface which is located on a side opposite the third light incident surface with respect to the light combiner and through which combined light exits, the combined light being a combination of first light incident on the first light incident surface, second light incident on the second light incident surface, and third light incident on the third light incident surface, that the plurality of the light modulators include a first light modulator that faces the first light incident surface, modulates the first light, and outputs the modulated first light to the first light incident surface, a second light modulator that faces the second light incident surface, modulates the second light, and outputs the modulated second light to the second light incident surface, and a third light modulator that faces the third light incident surface, modulates the third light, and outputs the modulated third light to the third light incident surface, and that the pivotal axis includes a pivotal axis parallel to one of a first axis that is roughly perpendicular to the optical axis and passes through centers of modulation areas of the first and second light modulators and a second axis that is roughly perpendicular to the optical axis and perpendicular to the first axis.

According to the configuration described above, since the first and second axes are defined based on the configurations and arrangement of the light modulators and the light combiner, the pivotal axis parallel to the first and second axes can be readily defined. Further, the configuration and arrangement of the attitude adjustment apparatus, which causes the image formation unit to pivot around the thus defined pivotal axis, can be readily designed.

In the aspect described above, it is preferable that the pivotal axis includes a pivotal axis that is parallel to the second axis and passes through an intersection of the first axis and an axis passing through a center of a modulation area of the third light modulator and parallel to the optical axis.

According to the configuration described above, the pivotal axis parallel to the second axis passes through the center of the light combiner. Causing the image formation unit (light modulators) to pivot around the thus set pivotal axis allows reduction in the amount of movement of the image formation unit (light modulators) in the case described above as compared with a case where the image formation unit (light modulators) is caused to pivot about a pivotal axis that does not pass through the center of the light combiner, provided that the image formation unit inclines with respect to the projection optical apparatus by the same amount. That is, the amount of movement of the image formation unit (light modulators) can be reduced in the case where the pivotal axis passes through the center of the light combiner as compared with the case where the pivotal axis does not pass through the center of the light combiner, provided that the image formation unit inclines by the same amount. Therefore, since the margin of the light flux incident on each of the light modulators (illumination margin) can be reduced, the light outputted from the light source apparatus and used to form an image can be used at increased efficiency.

In the aspect described above, it is preferable that the attitude adjustment apparatus includes a first pivotal motion section that causes the light combiner to pivot around the pivotal axis that is a pivotal axis parallel to the first axis and a second pivotal motion section that causes the light combiner to pivot around the pivotal axis that is a pivotal axis parallel to the second axis.

According to the configuration described above, the range over which the attitude of the image formation unit is adjusted can be increased as compared with a case where the attitude adjustment apparatus includes only one of the first pivotal motion section and the second pivotal motion section. The attitude of each of the light modulators can therefore be adjusted to an attitude that prevents occurrence of the one-side defocus described above.

In the aspect described above, it is preferable that the second pivotal motion section causes the light combiner to pivot around a pivotal axis that passes through an intersection of the first axis and an axis passing through a center of a modulation area of the third light modulator and parallel to the optical axis, and that the first pivotal motion section supports the second pivotal motion section and causes the second pivotal motion section to pivot to cause the light combiner to pivot.

According to the configuration described above, since the second pivotal motion section causes the light combine to pivot around the pivotal axis described above, the light use efficiency can be increased as described above.

Further, the first pivotal motion section, which supports the second pivotal motion section, allows the pivotal axis of the second pivotal motion section to be readily so set that the pivotal axis passes through the intersection of the first axis and the axis passing through the center of the modulation area of the third light modulator and parallel to the optical axis of the projection optical apparatus. Therefore, in the attitude adjustment apparatus having both the pivotal axis parallel to the first axis and the pivotal axis parallel to the second axis, the configuration in which the pivotal axis parallel to the second axis is the pivotal axis passing through the center of the light combiner can be simplified, and the assembly of the attitude adjustment apparatus can be simplified.

In the aspect described above, it is preferable that the pivotal axis of the first pivotal motion section is so set as to be shifted from the light combiner toward the projection optical apparatus.

Since the range over which the image formation unit is moved in the pivotal motion around the first pivotal axis is smaller than the range over which the image formation unit is moved in the pivotal motion around the second pivotal axis as described above, the configuration in which the pivotal axis of the first pivotal motion section is shifted from the center of the light combiner toward the projection optical apparatus does not greatly change the range over which the image formation unit is moved.

Further, since the pivotal axis of the first pivotal motion section is shifted from the light combiner toward the projection optical apparatus, and the pivotal axis therefore does not necessarily need to pass through the center of the light combiner, the configuration of the first pivotal motion section, which supports the second pivotal motion section, can be simplified, and the first pivotal motion section can be readily disposed. The configuration and assembly of the attitude adjustment apparatus can therefore be simplified.

In the aspect described above, it is preferable that the attitude adjustment apparatus includes a support member that supports the first pivotal motion section, and that the first pivotal motion section includes a frame that supports the second pivotal motion section, a pivotal motion mechanism that causes the frame to pivot, and a sealing member that seals a gap between the frame and the support member.

In a case where dust having entered the interior of the projector adheres to the image formation unit, a shadow of the dust appears in or otherwise interferes with an image formed by the image formation unit, so that the image deteriorates, and the dust is so heated that the temperature of the image formation unit locally increases and other factors thereof deteriorate, resulting in accelerated degradation of the image formation unit. The same holds true for other optical parts to which the dust adheres.

On the other hand, a gap according to the amount of pivotal motion of the frame needs to be provided between the frame and the support member, and the dust having entered the projector could further enter the space where the image formation unit is disposed through the gap.

To eliminate the concern described above, the sealing member seals the gap described above and can therefore prevent the dust from entering the space where the image formation unit is disposed through the gap. Deterioration of an image and degradation of parts can therefore be avoided.

In a case where the support member detachably supports the projection optical apparatus, dust is likely to enter the exterior enclosure through an opening formed in the exterior apparatus of the projector and used to extract the projection optical apparatus. However, since the gap described above is sealed by the sealing member, adherence of dust to the image formation unit and other components can be avoided even when the projection optical apparatus is exchanged.

In the aspect described above, it is preferable that at least one of the first and second pivotal motion sections includes a driver that produces drive force that causes the light combiner to pivot and a pivotal motion apparatus that is driven by the driver to cause the light combiner to pivot.

According to the configuration described above, the action of the driver can be so controlled as to adjust the inclination of the image formation unit not only during the assembly of the projector but even after the shipment of the projector. Further, fine adjustment of the image formation unit can be made, as compared with a case where the inclination adjustment is manually performed.

In the aspect described above, it is preferable that the attitude adjustment apparatus includes a pivotal motion member that includes a shaft section that serves as the pivotal axis and pivots integrally with the light combiner, a first positioning surface that is a flat surface that intersects one of two directions perpendicular to the pivotal axis and perpendicular to each other, a second positioning surface that is a flat surface that intersects another of the two directions, a first urging member that urges the shaft section against the first positioning surface, and a second urging member that urges the shaft section against the second positioning surface.

When the shaft section, which serves as the pivotal axis, inclines, the image formation unit could not appropriately pivot. On the other hand, in a case where the positioning surfaces are each a curved surface, and when the shaft section is urged against the positioning surfaces to position the shaft section to prevent the shaft section from inclining, the shaft section undesirably moves along the curved surfaces, and the shaft section could not therefore be positioned.

In contrast, according to the configuration described above, the shaft section is urged by the first and second urging members against the first positioning surface, which intersects one of the two directions described above, and the second positioning surface, which interests the other one of the two directions, and positioned there. That is, the shaft section is urged against the first and second positioning surfaces, which are flat surfaces that interest each other. The inclination and play of the shaft section can therefore be avoided, whereby the attitude of the image formation unit can be stably adjusted.

In the aspect described above, it is preferable that the attitude adjustment apparatus includes an urged member provided as part of the shaft section, and that the urged member has a first surface that is located on a side opposite the first positioning surface with respect to the shaft section and pressed by the first urging member and a second surface that is located on a side opposite the second positioning surface with respect to the shaft section and pressed by the second urging member.

Since the shaft section is caused to pivot with the shaft section urged against the first and second positioning surfaces described above, the shaft section needs to have a cylindrical shape. It is, however, difficult to directly press the cylindrical shaft section with the first and second urging members, which are each, for example, a coil spring.

In contrast, according to the configuration described above, the shaft section is provided with the urged member, and the first and second surfaces of the urged member are pressed by the first and second urging members, so that the shaft section is urged against the first and second positioning surfaces described above. Therefore, even in the case where the first and second urging members are each a simple urging member, such as a coil spring, the first and second urging members can urge the shaft section.

In the aspect described above, it is preferable that the image formation apparatus includes a plurality of the light modulators and a light combiner that is integrated with the plurality of the light modulators and combines light fluxes incident from the plurality of the light modulators with one another, that the attitude adjustment apparatus adjusts an attitude of the light combiner to adjust attitudes of the light modulators, that the attitude adjustment apparatus includes a pivotal motion member provided integrally with the light combiner and a pivotal motion apparatus that causes the pivotal motion member to pivot around the pivotal axis to cause the light combiner to pivot along with the pivotal motion member, that the pivotal motion apparatus includes a lead screw having an axis of rotation parallel to an axis perpendicular to the pivotal axis, that the pivotal motion member includes an engagement section that engages with the lead screw, and that the engagement section engages with the lead screw in a portion on a side opposite the pivotal axis with respect to the lead screw.

It is conceivable to propose an attitude adjustment apparatus that prevents occurrence of the one-side defocus described above by inclining the image formation unit in which a plurality of the light modulators are integrated with the light combiner that combines light fluxes having passed through the plurality of light modulators with respect to a plane perpendicular to the optical axis of the projection optical apparatus.

As the configuration of the attitude adjustment apparatus described above, it is conceivable to propose a configuration in which a lead nut caused to pivot integrally with the light combiner is so disposed as to be shifted from the pivotal axis of the light combiner and a lead screw that engages with the lead nut is disposed in parallel to the direction perpendicular to the pivotal axis. When the lead screw is caused to pivot in the configuration, the light combiner and hence the image formation unit described above is caused to pivot around the pivotal axis.

The adjustment of the inclination of the light combiner needs to be accurate adjustment, and a lead screw is suitable for accurate adjustment of the position of an adjustment target using large force (torque). A lead screw is, however, a mechanism for converting rotational motion into linear motion and is not a suitable mechanism for causing an adjustment target to pivot.

Further, in a case where the lead screw is so disposed that the center axis thereof intersects the direction parallel to the pivotal axis described above, and the lead screw and the lead nut are so positioned as to be relatively close to the pivotal axis, the amount of pivotal motion of the pivotal motion member and hence the amount of pivotal motion (angle of pivotal motion) of the image formation unit is greater than the amount of pivotal motion of the lead screw. The range over which the inclination of the image formation unit is adjusted (pivotal motion range) and which is necessary for prevention of occurrent of the one-side defocus described above, is however, relatively small.

It is therefore conceivable to make the amount of pivotal motion of the image formation unit smaller than the amount of pivotal motion of the lead screw described above by maximizing the separation between the pivotal axis and the lead nut. In this case, however, the attitude adjustment apparatus tends to be a large apparatus.

In view of the problems described above, it has been desired to provide a configuration that allows a compact attitude adjustment apparatus and fine adjustment of the inclination of the image formation unit and hence a projector that allows fine adjustment of the amount of pivotal motion of a pivotal motion target.

To achieve the requirement described above, according to the configuration described above, the engagement section of the pivotal motion member, which pivots integrally with the light combiner, engages with the lead screw in the portion opposite the shaft section with respect to the lead screw. The amount of pivotal motion (angle of pivotal motion) of the pivotal motion member and hence the amount of pivotal motion of the light combiner can therefore be smaller than the amount of pivotal motion of the lead screw, as compared with a case where the engagement section engages with the lead screw in a portion facing the shaft section with respect to the lead screw. Fine adjustment of the amount of pivotal motion of the light combiner, which is the pivotal motion target can therefore be made. Further, since the lead screw and the engagement section can therefore be so positioned as to be close to the pivotal axis described above, the size of the attitude adjustment apparatus and hence the size of the projector can be reduced.

In the aspect described above, it is preferable that the lead screw has a helical groove formed along an outer circumference of the lead screw, that the engagement section has a tooth that engages with the helical groove, and that the tooth is located on a side opposite the pivotal axis with respect to the lead screw.

According to the configuration described above, the portion of the engagement section that engages with the lead screw can be set in the portion on the side opposite the pivotal axis described above with respect to the lead screw.

In the aspect described above, it is preferable that the engagement section is so shaped as to surround the lead screw along an outer circumference thereof.

The configuration described above can prevent the engagement section from disengaging from the lead screw due to some cause. The engagement section can therefore engage with the lead screw.

When the engagement section shaped as described above and the lead screw are viewed in the axial direction of the lead screw, and the center of the lead screw is shifted in the direction away from the pivotal axis described above from the center of the opening of the engagement section into which the lead screw is inserted, the lead screw is readily allowed to come into contact with the portion of the inner edge of the opening that is opposite the pivotal axis. In this case, the lead screw is therefore allowed to engage with the portion opposite the pivotal axis described above.

In the aspect described above, it is preferable that the attitude adjustment apparatus includes a first pulley provided integrally with the lead screw, a shaft member so disposed that an axis of rotation thereof is parallel to the lead screw, a second pulley provided integrally with the shaft member, a transmission member that transmits pivotal motion of the first pulley to the second pulley, and a pivotal motion detection section that detects pivotal motion of the shaft member.

The amount of pivotal motion (angle of pivotal motion) of the light combiner, which is the pivotal motion target, can be detected by detection of the amount of pivotal motion of the lead screw without direct detection of the amount of pivotal motion of the light combiner. To directly detect the amount of pivotal motion of the lead screw, however, it is necessary to dispose a detection section, such as a relatively large sensor, in the vicinity of the lead screw. On the other hand, since the lead screw engages with the pivotal motion member via the engagement section described above, and the pivotal motion member is caused to pivot integrally with the light combiner, the detection section needs to be so disposed as not to interfere with the pivotal motion member or the light combiner, and it is therefore difficult to dispose the detection section.

In contrast, according to the configuration described above, the pivotal motion of the lead screw is transmitted to the shaft member via the first pulley, the transmission member, and the second pulley, and the pivotal motion of the shaft member is detected with the pivotal motion detection section. The amount of pivotal motion of the lead screw can therefore be detected with the pivotal motion detection section so positioned as to be separate from the lead screw. Therefore, the pivotal motion detection section can be arranged with improved flexibility, and the pivotal motion detection section can be so disposed as not to interfere with the pivotal motion member or the light combiner.

In the aspect described above, it is preferable that the second pulley increases a speed of the pivotal motion transmitted by the transmission member from the first pulley.

According to the configuration described above, the shaft member provided with the second pulley pivots by a greater amount than the first pulley. The amount of pivotal motion of the shaft member can therefore be readily detected by the pivotal motion detection section, whereby the amount of pivotal motion of the lead screw and hence the amount of pivotal motion of the pivotal motion member and the light combiner can be detected with increased accuracy. Fine detection of the amount of pivotal motion of the light combiner, which is the pivotal motion target, can therefore be performed.

In the aspect described above, it is preferable that the pivotal motion detection section includes at least one of a potentiometer that engages with the shaft member and detects an amount of pivotal motion of the shaft member and a photosensor that is allowed to be blocked by a light blocker provided as part of the shaft member in accordance with the pivotal motion of the shaft member.

According to the configuration described above, the amount of pivotal motion of the pivotal motion member and hence the light combiner can be detected based on the result of the detection performed by the potentiometer. Further, the light combiner is allowed to return to the original position with precision based on the result of the detection performed by the photosensor, which has high detection accuracy.

In the aspect described above, it is preferable that the transmission member is a timing belt, and that the attitude adjustment apparatus includes a tensioner that presses the timing belt to prevent slack of the timing belt.

According to the configuration described above, the transmission member can be simply formed. Further, since tensioner prevents slack of the timing belt, the pivotal motion of the first pulley can be transmitted to the second pulley and hence the shaft member with no loss of the pivotal motion. Detection of the amount of pivotal motion of the shaft member therefore allows accurate detection of the amount of pivotal motion of the lead screw and hence the light combiner.

BRIEF DESCRIPTION OF THE DRAWINGS

The invention will be described with reference to the accompanying drawings, wherein like numbers reference like elements.

FIG. 6 is a perspective view showing the attitude adjustment apparatus in the first embodiment.

FIG. 10 shows a pivotal motion support section in the first embodiment.

FIG. 15 is a perspective view showing a lead screw and a pivotal motion member in the first embodiment.

DESCRIPTION OF EXEMPLARY EMBODIMENTS

First Embodiment

A first embodiment of the invention will be described below with reference to the drawings.

Schematic Configuration of Projector

Figure 1:
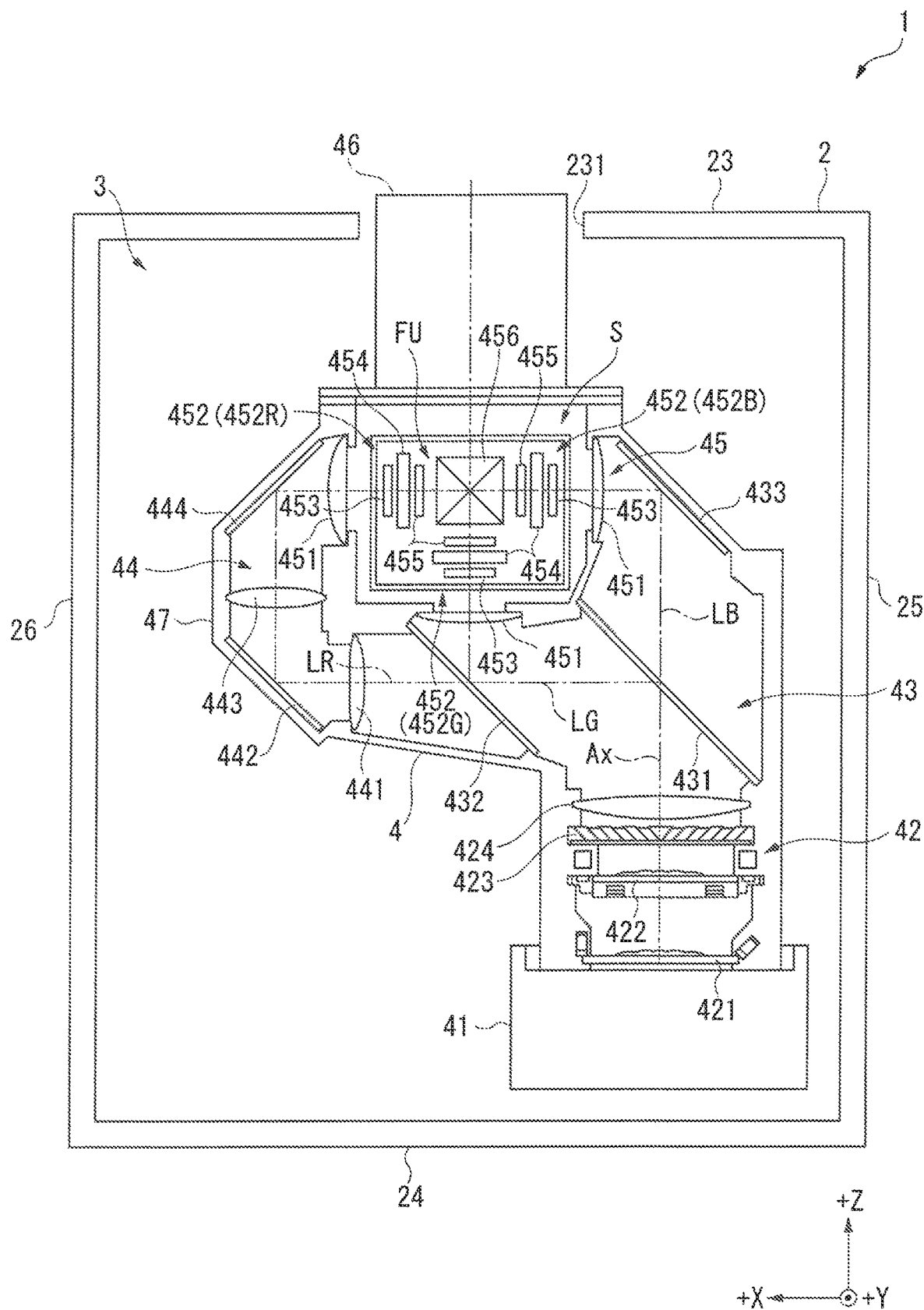
FIG. 1 is a diagrammatic view showing the configuration of a projector according to a first embodiment of the invention.

FIG. 1 is a diagrammatic view showing the configuration of a projector 1 according to the present embodiment.

The projector 1 according to the present embodiment is a projection-type display apparatus that modulates light outputted from a light source apparatus 41 provided in the projector 1 to form an image according to image information and enlarges and projects the image on a projection surface, such as a screen. The projector 1 includes an exterior enclosure 2, which forms the exterior of the projector 1, and an apparatus body 3, which is accommodated in the exterior enclosure 2, as shown in FIG. 1. The thus configured projector 1 is partly characterized, although will be described later in detail, in that it includes an attitude adjustment apparatus (see FIG. 2), which adjusts the inclination of an image formation unit FU.

The configuration of the projector 1 will be described below in detail.

Configuration of Exterior Enclosure

The exterior enclosure 2 is formed in a roughly box-like shape. The exterior enclosure 2 has not only a front surface section 23, a rear surface section 24, a left side surface section 25, and a right side surface section 26 but, although not shown, a top surface section connected to one-end sides of the surface sections 23 to 26 and a bottom surface section connected to the-other-end sides of the surface sections 23 to 26. The bottom surface section is a surface that faces the surface on which the projector 1 is installed, and a plurality of legs are disposed on the bottom surface.

The front surface section 23 has an opening 231. Part of a projection optical apparatus 46, which will be described later, is exposed through the opening 231, and the projection optical apparatus 46 projects an image.

Configuration of Apparatus Body

The apparatus body 3 includes an image projection apparatus 4. The apparatus body 3 further includes, although not shown in FIG. 1, a controller that controls the action of the projector 1, a power supply that supplies electronic parts that form the projector 1 with electric power, and a cooler that cools cooling targets that form the projector 1.

Configuration of Image Projecting Apparatus

The image projection apparatus 4 forms an image according to image information (including image signal) inputted from the controller and projects the image on the projection surface described above. The image projection apparatus 4 includes the light source apparatus 41, a homogenizing apparatus 42, a color separation apparatus 43, a relay apparatus 44, an image formation apparatus 45, the projection optical apparatus 46, and an optical part enclosure 47.

The light source apparatus 41 outputs illumination light to the homogenizing apparatus 42. The thus functioning light source apparatus 41 can, for example, be configured to include a solid-state light source that emits blue light that is light source light, such as a laser diode (LD), and a wavelength conversion element that converts, in terms of wavelength, part of the blue light emitted from the solid-state light source into fluorescence containing green light and red light. The light source apparatus 41 can instead, for example, be configured to include a light source lamp, such as an ultrahigh-pressure mercury lamp, as the light source or another type of solid-state light source, such as a light emitting diode (LED).

The homogenizing apparatus 42 homogenizes the illuminance of the light flux incident from the light source apparatus 41. The homogenizing apparatus 42 includes a first lens array 421, a second lens array 422, a polarization conversion element 423, and a superimposing lens 424. The homogenizing apparatus 42 may further include a light adjustment apparatus that blocks part of the light flux incident thereon to adjust the amount of exiting light and a variety of filters.

Out of the components described above, the polarization conversion element 423 aligns the polarization directions of the light flux incident through the second lens array 422 with one another to form linearly polarized light of one type and outputs the linearly polarized light.

The color separation apparatus 43 separates red light LR, green light LG, and blue light LB from the light flux incident from the homogenizing apparatus 42. The color separation apparatus 43 includes a dichroic mirror 431, which reflects the red light LR and the green light LG but transmits the blue light LB, a dichroic mirror 432, which transmits the red light LR but reflects the green light LG, and a reflection mirror 433, which reflects the separated blue light LB toward a field lens 451 for blue light. The green light LG reflected off the dichroic mirror 432 is incident on a field lens 451 for green light.

The relay apparatus 44 includes a light-incident-side lens 441, a reflection mirror 442, a relay lens 443, and a reflection mirror 444, which are provided in the optical path of the red light LR having passed through the dichroic mirror 432, and guides the red light LR to a field lens 451 for red light. In the present embodiment, the image projection apparatus 4 is so configured that the red light LR passes through the relay apparatus 44, but not necessarily. For example, the image projection apparatus 4 may be so configured that the blue light LB passes through the relay apparatus 44.

The image formation apparatus 45 modulates on a color light basis the color light fluxes separated by the color separation apparatus 43 and combines the modulated color light fluxes with one another to form an image according to the image information described above. The image formation apparatus 45 includes the field lenses 451 and light modulators 452 provided in association with the three color light fluxes LR, LG, and LB described above and one light combiner 456.

The light modulators 452 (reference characters 452R, 452G, and 452B denote light modulators associated with red light, green light, and blue light, respectively) are each formed of a liquid crystal light valve including a transmissive liquid crystal panel 454, which has a light incident surface and a light exiting surface different from each other, and a light-incident-side polarizer 453 and a light-exiting-side polarizer 455, which are located on the light incident side and the light exiting side of the liquid crystal panel 454. The liquid crystal panel 454 employed in the present embodiment is a liquid crystal panel having a modulation area where color light incident thereon is modulated (image formation area where image light according to the color light is formed) and which has an aspect ratio of 4:3 or 16:9 (ratio of longitudinal side to lateral side).

The light combiner 456 combines the color light fluxes having passed through the light modulators 452 with one another to form the image described above. The light combiner 456 is formed of a cross dichroic prism having a roughly box-like shape (roughly quadrangular columnar shape) in the present embodiment. The cross dichroic prism is a prism formed of four right-angled triangular prisms bonded to each other and therefore having a roughly box-like shape, and two dielectric multilayer films are located on the interfaces between the four prisms.

The thus configured light combiner 456 has three light incident surfaces 456B, 456G, and 456R (see FIG. 5 and other figures), which face the light modulators 452 and on which the color light fluxes having passed through the light modulators 452 are incident, and one light exiting surface 456E (see FIG. 5 and other figures), through which the combined light, which is the combination of the color light fluxes (that is, image light), exits. The light combiner 456 combines the color light fluxes incident from the light modulators 452 through the light incident surfaces 456B, 456G, and 456R with one another to form the image light with the aid of the two dielectric multilayer films described above and outputs the image light through the light exiting surface 456E. The image light having exited through the light exiting surface 456E enters the projection optical apparatus 46.

To the light incident surfaces 456B (first light incident surface), 456G (third light incident surface), and 456R (second light incident surface) of the thus configured light combiner 456 are attached holding members HM (see FIG. 2), which hold the corresponding light modulators 452. The light combiner 456 is thus integrated with the light modulators 452. In the integration process, the light modulators 452B and 452R are so disposed that the short sides of the modulation areas (image formation areas) of the liquid crystal panels 454 provided in the light modulators 452B and 452R extend in the +Y direction and the long sides of the modulation areas extend in the +Z direction. The light modulator 452G is so disposed that the short sides of the modulation area of the liquid crystal panel 454 provided in the light modulator 452G extend in the +Y direction and the long sides of the modulation area extend in the +X direction.

The configuration in which the light modulators 452 are integrated with the light combiner 456 is hereinafter referred to as an image formation unit FU. The image formation unit FU is supported by the attitude adjustment apparatus 5, which will be described later.

The projection optical apparatus 46 enlarges and projects the image light incident from the light combiner 456 on the projection surface described above to display an image formed by the image light on the projection surface. The projection optical apparatus 46 is formed of a combination lens formed of a plurality of lenses arranged in a lens barrel.

Although not shown, the projection optical apparatus 46 is so supported by a shifter as to be movable in two directions perpendicular not only to the optical axis (center axis) of the projection optical apparatus 46 but to each other (±X and ±Y directions, which will be described later). The shifter holds the projection optical apparatus 46 in an exchangeable (detachable) manner and is attached to a support member 8 of the attitude adjustment apparatus 5, which will be described later. The projection optical apparatus 46 can instead be attached to the support member 8 via no shifter, but not necessarily, and the projection optical apparatus 46 and the shifter may be attached to the support member 8 in non-detachable manner.

The optical part enclosure 47 holds the apparatus 42 to 44 described above and the field lenses 451.

An illumination optical axis Ax, which is the optical axis in the design stage, is set in the image projection apparatus 4, and the optical part enclosure 47 holds the apparatus 42 to 44 described above and the field lenses 451 in predetermined positions on the illumination optical axis Ax. In the optical part enclosure 47, a space S, in which the image formation unit FU is disposed, is formed in a position where three sides of the image formation unit FU are surrounded by the field lenses 451.

The light source apparatus 41 and the projection optical apparatus 46 are disposed in predetermined positions on the illumination optical axis Ax.

Configuration of Attitude Adjustment Apparatus

Figure 2:
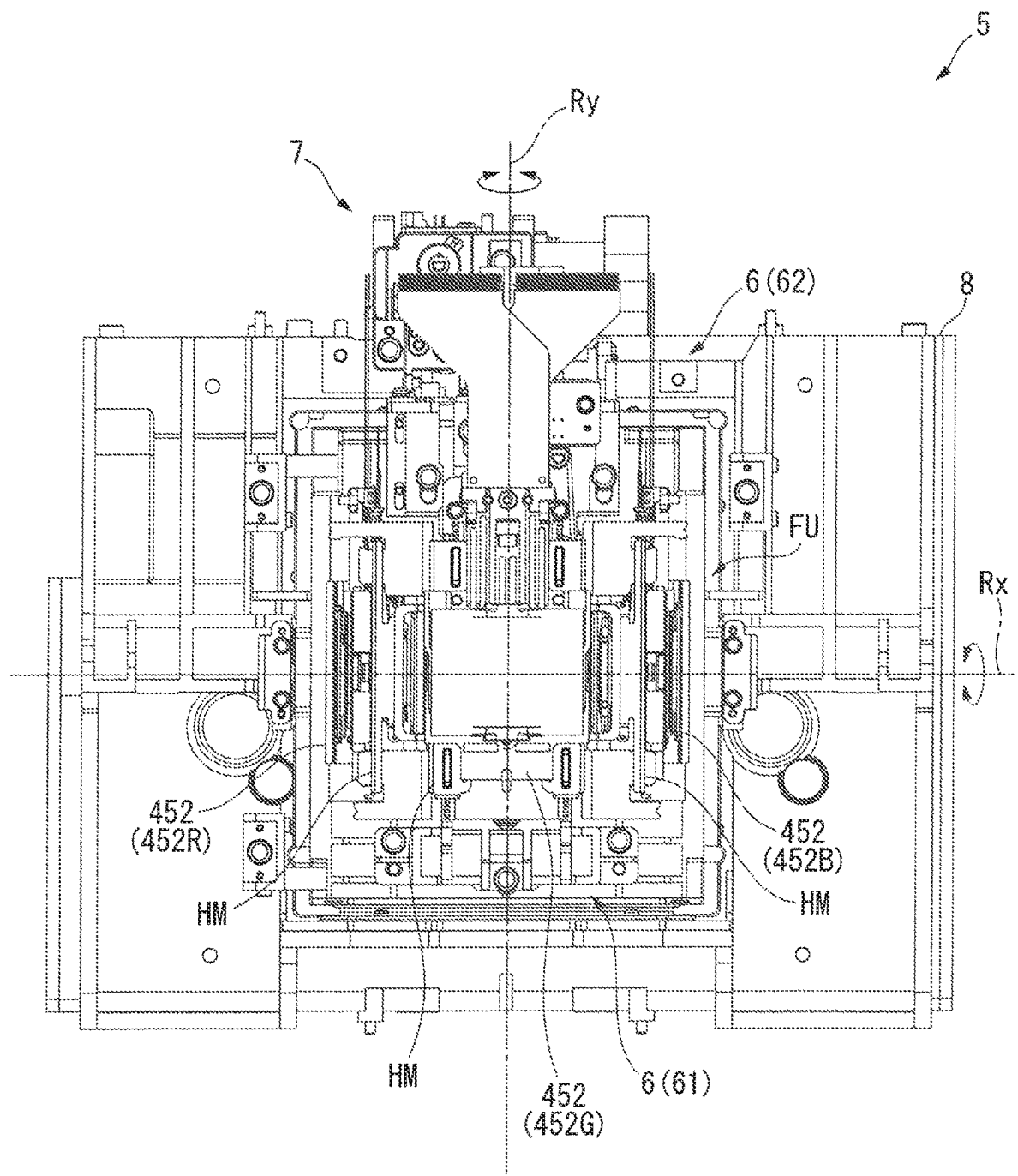
FIG. 2 shows an attitude adjustment apparatus in the first embodiment viewed from the light incident side.
Figure 3:
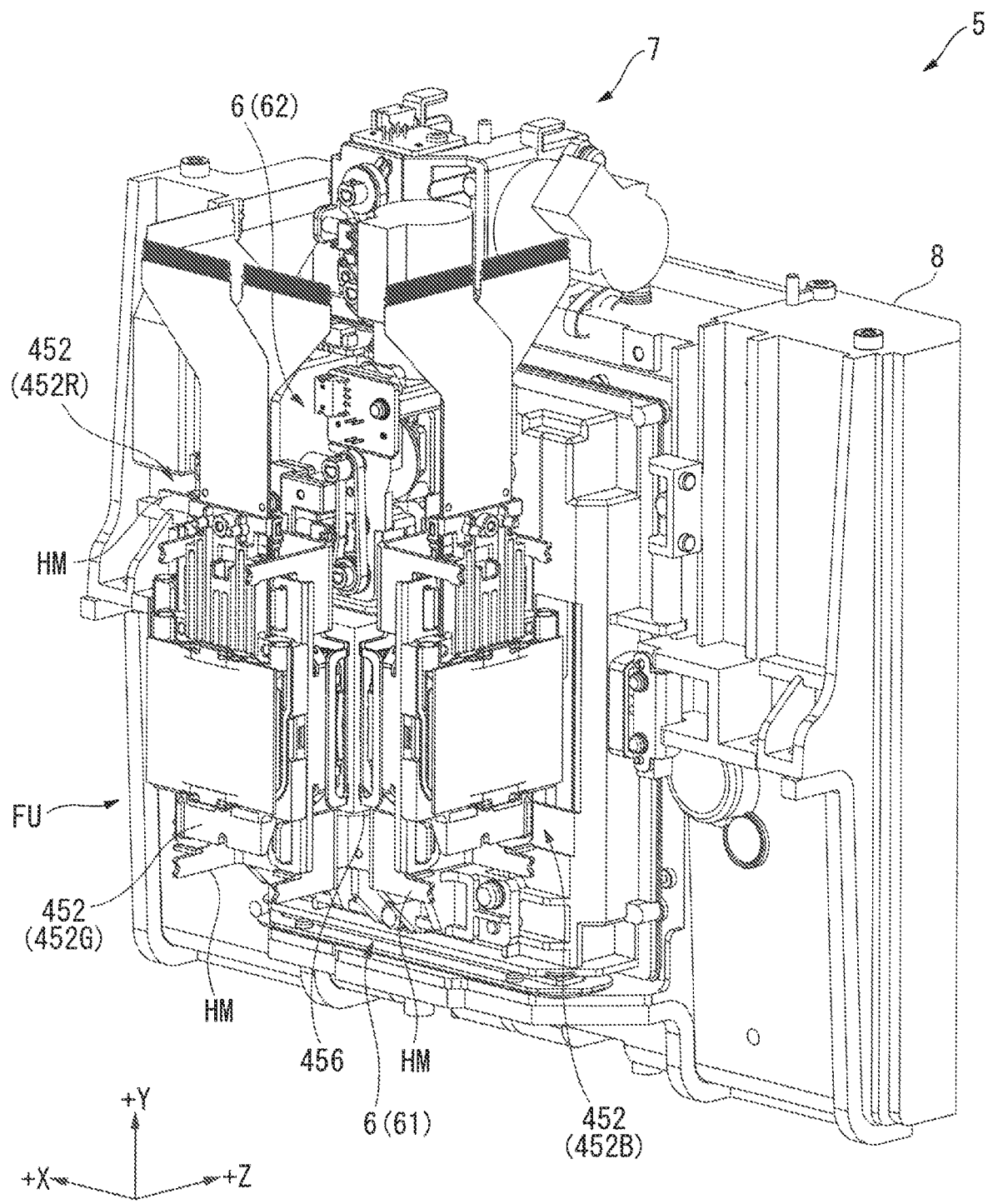
FIG. 3 is a perspective view of the attitude adjustment apparatus in the first embodiment viewed from the light incident side.
Figure 4:
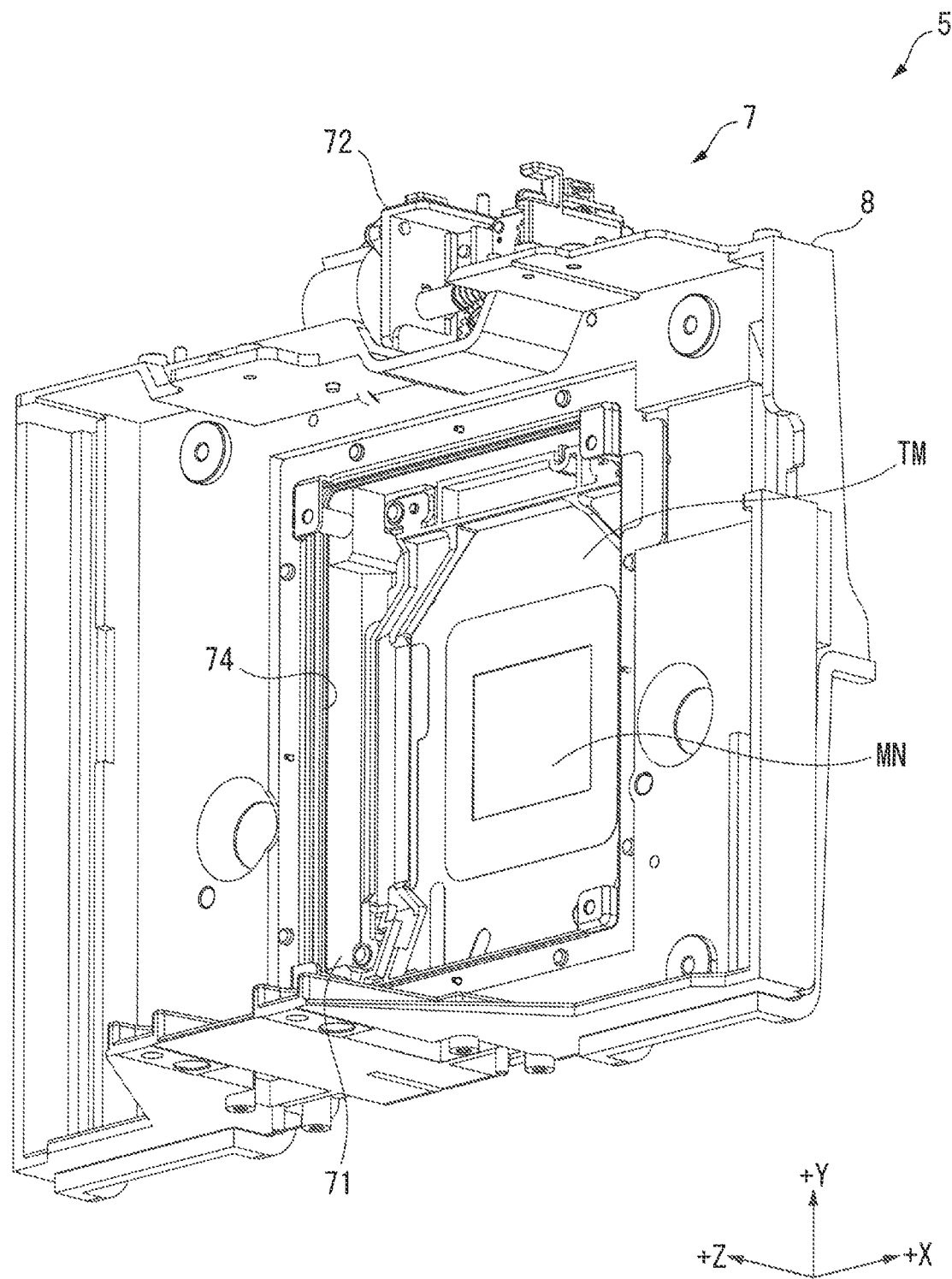
FIG. 4 is a perspective view of the attitude adjustment apparatus in the first embodiment viewed from the light exiting side.
Figure 5:
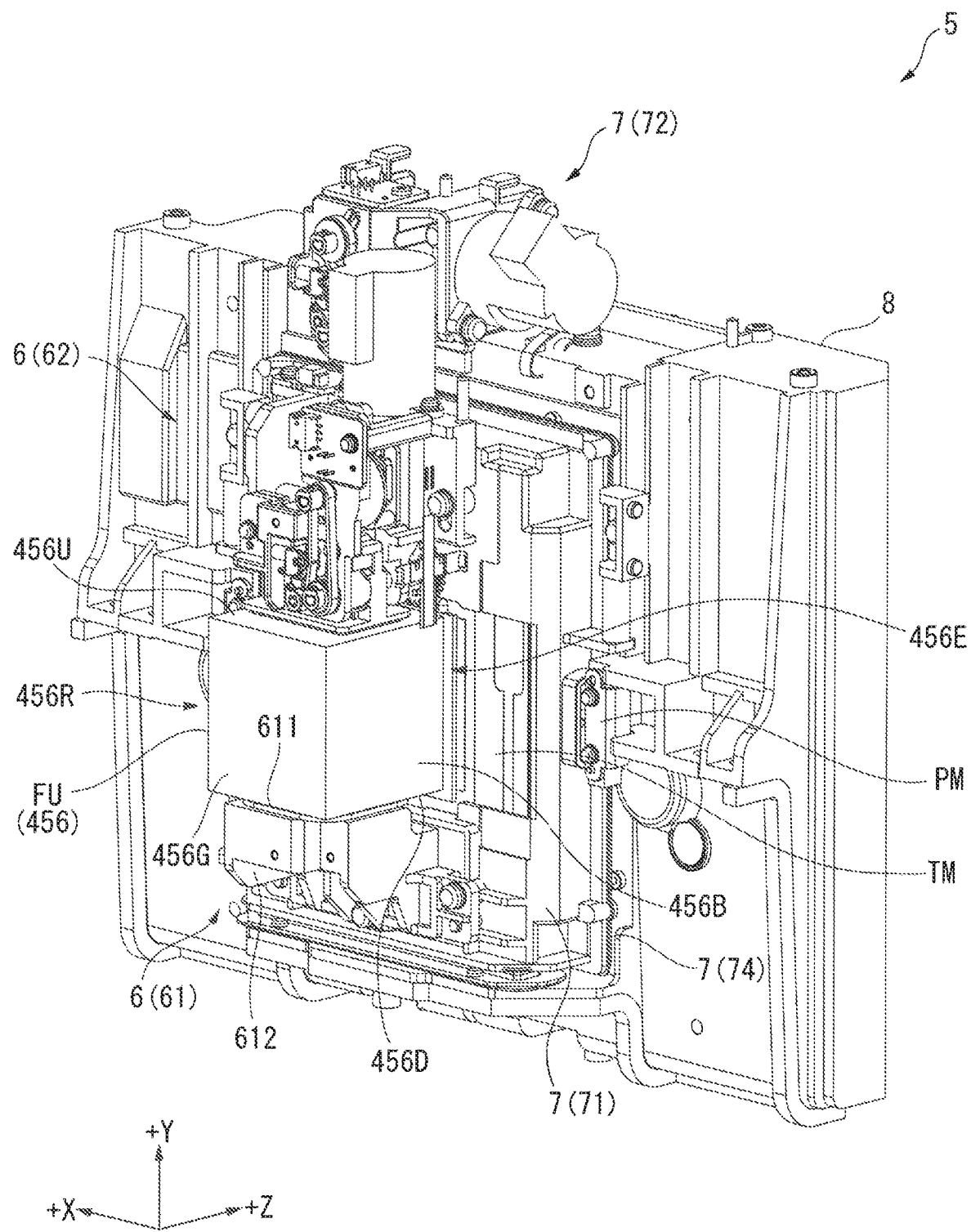
FIG. 5 is a perspective view of the attitude adjustment apparatus in the first embodiment viewed from the light incident side.

FIG. 2 shows the attitude adjustment apparatus 5 viewed from one of the sides via which light is incident on the image formation unit FU with the attitude adjustment apparatus 5 holding the image formation unit FU. FIG. 3 is a perspective view of the attitude adjustment apparatus 5 viewed from the side via which light is incident on the image formation unit FU described above, and FIG. 4 is a perspective view of the attitude adjustment apparatus 5 viewed from the side via which light exits out of the image formation unit FU described above. FIG. 5 is a perspective view of the attitude adjustment apparatus 5 viewed from the light incident side with the attitude adjustment apparatus 5 holding the light combiner 456.

The image projection apparatus 4 includes the attitude adjustment apparatus 5 shown in FIGS. 2 to 5 as well as the configuration described above.

In the following description, the axis parallel to the optical axis of the projection optical apparatus 46 described above is called an axis Z, and two axes perpendicular not only to the axis Z but to each other are called an axis X and an axis Y. Out of the directions associated with the three axes described above, the direction parallel to the axis Z and oriented from the rear surface section 24 toward the front surface section 23 is called a +Z direction. The direction parallel to the axis X and oriented from the left side surface section 25 toward the right side surface section 26 is called a +X direction, and the direction parallel to the axis Y and oriented from the bottom surface section described above toward the top surface section described above is called a +Y direction. That is, the +Z direction is the direction in which the projection optical apparatus 46 projects the image light when viewed from the +Y-direction side. Although not shown, the direction opposite the +Z direction is called a −Z direction. The same holds true for a −X direction and a −Y direction.

The attitude adjustment apparatus 5 holds the light combiner 456 to hold the image formation unit FU, adjusts the inclination of the image formation unit FU with respect to the optical axis of the projection optical apparatus 46, and hence adjusts the attitude of the image formation unit FU. Specifically, the attitude adjustment apparatus 5 causes the light combiner 456 to pivot around pivotal axes Rx and Ry, which extend along the axes X and Y, respectively, which are perpendicular not only to the axis Z but to each other, to adjust the inclination (attitude) of the image formation unit FU. The attitude of the light modulators 452 with respect to the projection optical apparatus 46 is thus adjusted.

The thus configured attitude adjustment apparatus 5 includes a yaw pivotal motion section 6, a pitch pivotal motion section 7, and the support member 8.

Configuration of Yaw Pivotal Motion Section

Figure 7:
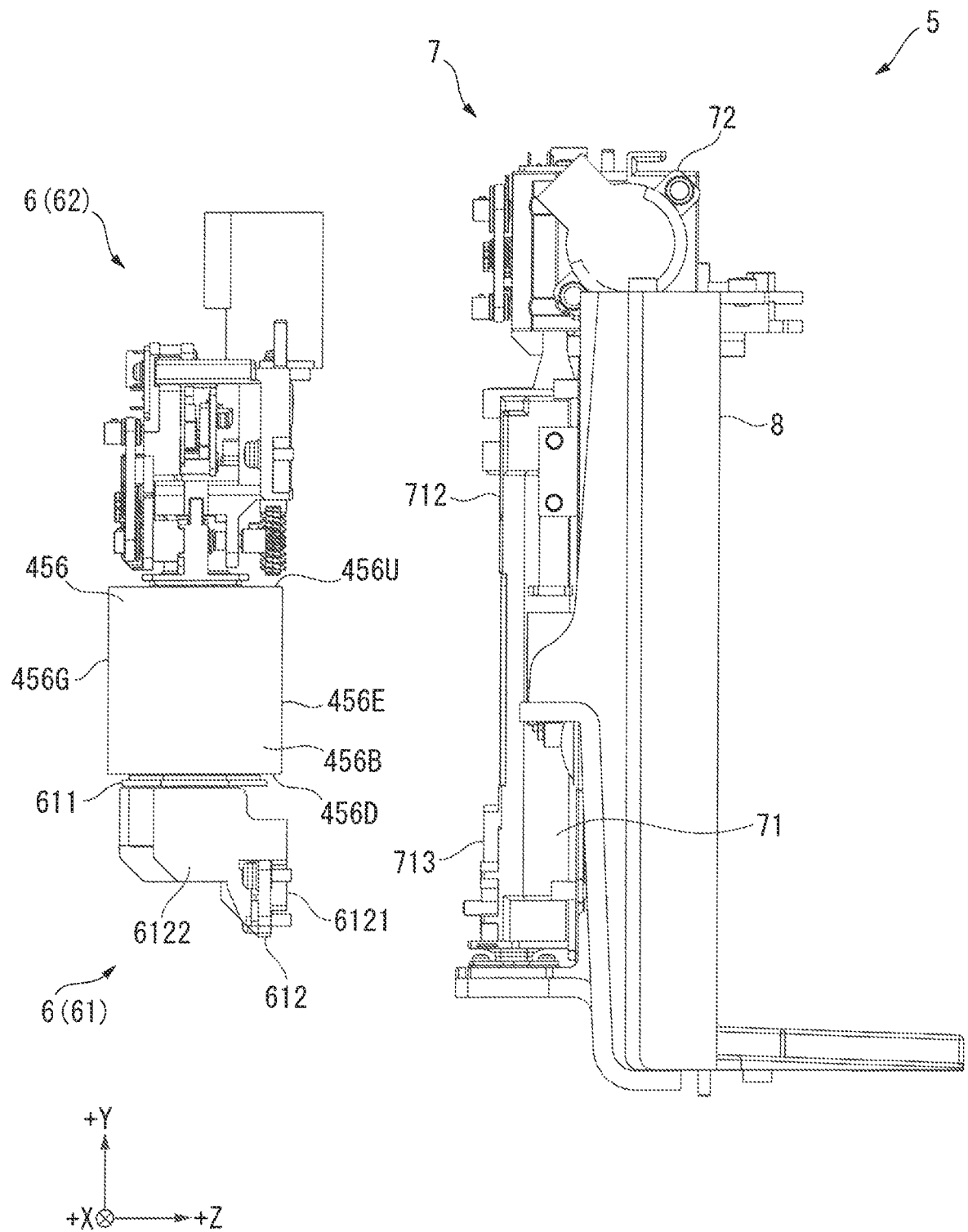
FIG. 7 is a side view showing the attitude adjustment apparatus in the first embodiment.

FIG. 6 is a perspective view of the attitude adjustment apparatus 5 viewed from the light incident side (−Z-direction side) with the yaw pivotal motion section 6 separated from the attitude adjustment apparatus 5, and FIG. 7 is a side view of the attitude adjustment apparatus 5 viewed from the −X-direction side.

The yaw pivotal motion section 6 is a Y pivotal motion section that supports the light combiner 456 and causes the light combiner 456 to pivot in the yaw direction around the pivotal axis Ry, and the yaw pivotal motion section 6 corresponds to the second pivotal motion section. The yaw pivotal motion section 6 includes a pivotal motion support section 61, which is located on the −Y-direction side of the light combiner 456, and a pivotal motion driver 62, which is located on the +Y-direction side of the light combiner 456, and the pivotal motion support section 61 and the pivotal motion driver 62 are attached to a frame 71 of the pitch pivotal motion section 7.

The pivotal axis Ry is a pivotal axis roughly perpendicular to the optical axis of the projection optical apparatus 46 described above and parallel to an axis (second axis) perpendicular to the axis passing through the centers of the modulation areas of the light modulators 452B and 452R.

Configuration of Pivotal Motion Support Section

Figure 8:
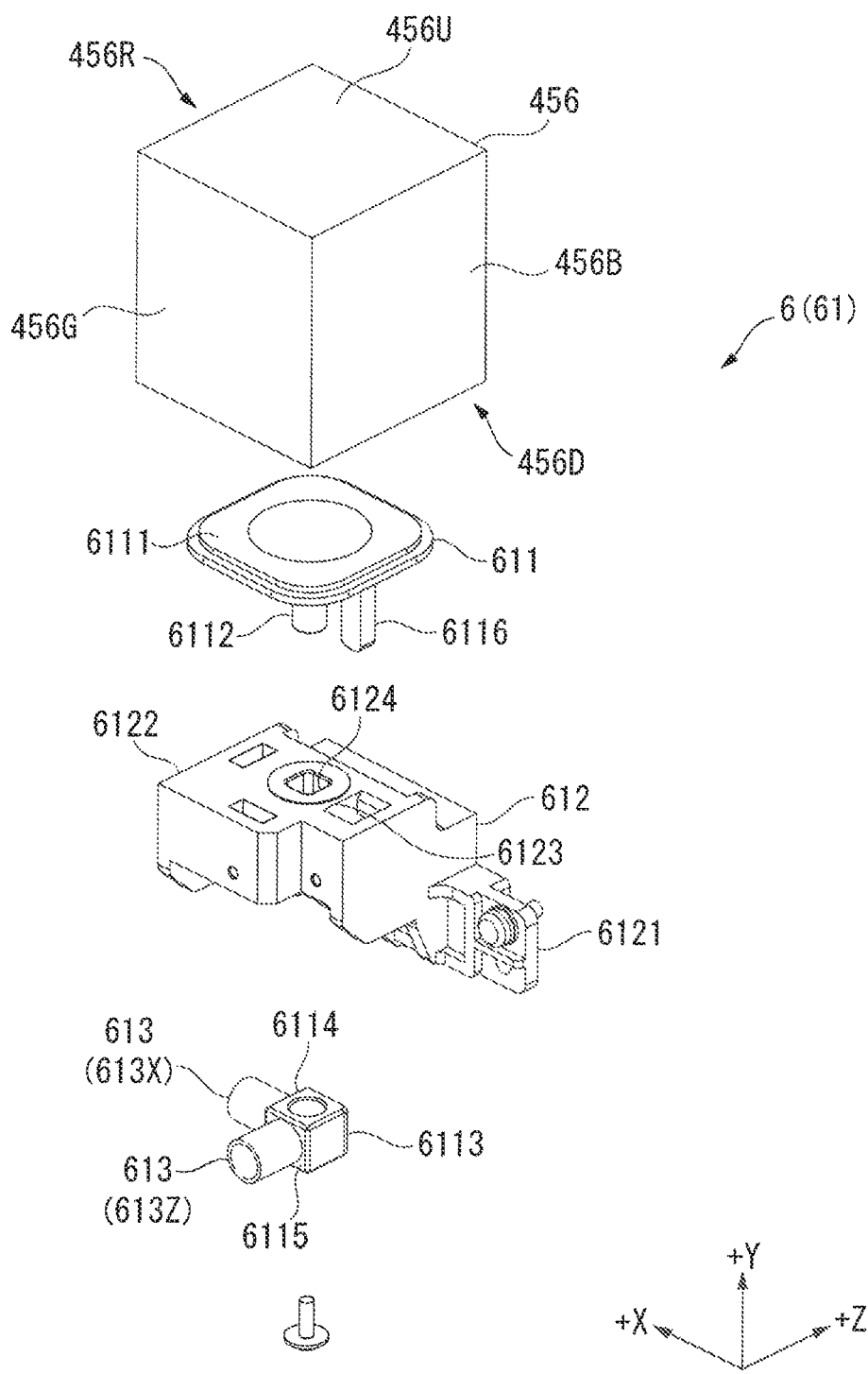
FIG. 8 is an exploded perspective view of a pivotal motion support section in the first embodiment viewed from the light incident side.
Figure 9:
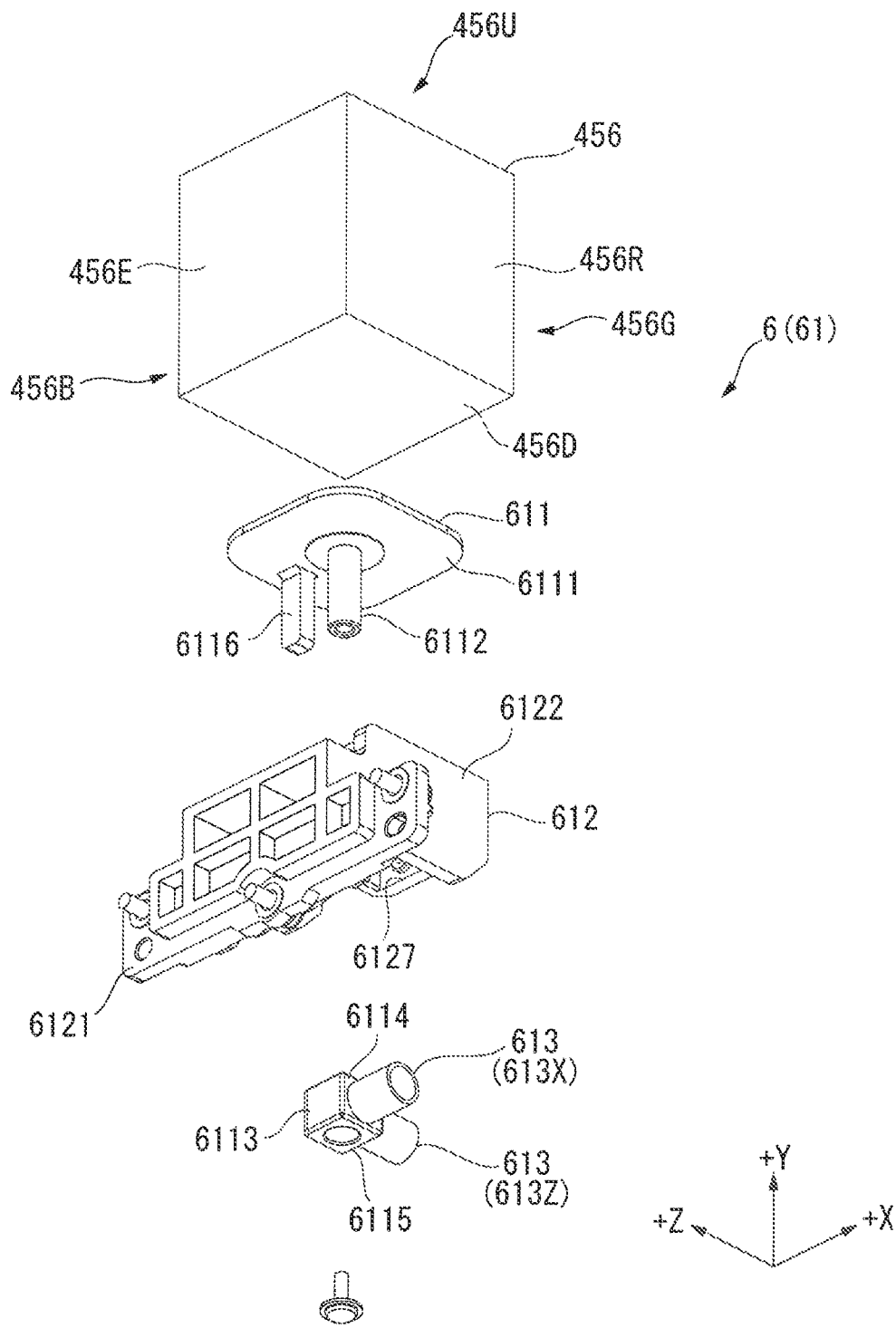
FIG. 9 is an exploded perspective view of the pivotal motion support section in the first embodiment viewed from the light exiting side.

FIGS. 8 and 9 are exploded perspective views of the pivotal motion support section 61 viewed from the light incident side (−Z-direction side) and the light exiting side (+Z-direction side), respectively.

The pivotal motion support section 61 supports the light combiner 456 from the −Y-direction side. The pivotal motion support section 61 includes a pivotal motion member 611, a linkage member 612, and two urging members 613 (613X and 613Z), as shown in FIGS. 8 and 9.

The pivotal motion member 611 is bonded and fixed to the light combiner 456, specifically, one of surfaces 456U and 456D, which intersect the light incident surfaces 456B, 456G, and 456R and the light exiting surface 456E, or the −Y-direction-side surface 456D. The pivotal motion member 611 includes a plate-shaped section 6111, a shaft section 6112, an urged member 6113, and a protruding section 6116.

The plate-shaped section 6111 is formed in a plate-like shape extending along an XZ plane. The +Y-direction-side surface of the plate-shaped section 6111 is bonded and fixed to the surface 456D described above.

The shaft section 6112 is a cylindrical portion that protrudes in the −Y direction from roughly the center of the −Y-direction-side surface of the plate-shaped section 6111 in the −Y direction and serves as the pivotal axis Ry of the light combiner 456. The shaft section 6112 is disposed in the position according to the center of the light combiner 456 (position where two dielectric multilayer films in cross dichroic prism described above intersect each other and not only optical center but physical center of light combiner 456) when the light combiner 456, which is formed in a box-like shape, is viewed from the +Y-direction side, and the shaft section 6112 extends in the +Y direction. That is, since the pivotal axis Ry is the center line of the light combiner 456 along the axis Y and coincides with an extension of the intersection line of the two dielectric multilayer films described above in the cross dichroic prism, which forms the light combiner 456, the shaft section 6112 is located on the extension. The thus formed shaft section 6112 is inserted into a rectangular opening 6124 formed in the linkage member 612.

The urged member 6113 is formed in a roughly box-like shape and fixed to a −Y-direction-side end portion of the shaft section 6112 with a screw. The urged member 6113 has an abutment surface 6114, which is perpendicular to the +X direction and against which the urging member 6113X abuts, and an abutment surface 6115, which is perpendicular to the +Z direction and against which the urging member 613Z abuts. The abutment surface 6114 is the +X-direction-side surface of the urged member 6113, and the abutment surface 6115 is the −Z-direction-side surface of the urged member 6113.

The protruding section 6116 is located on the −Y-direction-side surface of the plate-shaped section 6111, protrudes toward the −Y-direction side from a portion shifted from the shaft section 6112 toward the −X-direction side, and has a quadrangular columnar shape. The protruding section 6116 is inserted into an opening 6123 of the linkage member 612.

FIG. 10 shows the pivotal motion support section 61 viewed from the −Y-direction side. In FIG. 10, the urged member 6113 and the screw are omitted.

The linkage member 612 pivotably supports the pivotal motion member 611 described above and is linked to a frame 71. The linkage member 612 is formed in a roughly T-letter shape when viewed from the −Y-direction side, as shown in FIG. 10. The thus shaped linkage member 612 includes a linkage section 6121, which intersects the +Z direction, and a support section 6122, which supports the pivotal motion member 611, as shown in FIGS. 8 to 10.

The linkage section 6121 is linked to the frame 71 with screws.

The support section 6122 is formed in a roughly box-like shape and supports the pivotal motion member 611 described above and hence the image formation unit FU from the −Y-direction side. The support section 6122 has the openings 6123 and 6124, which pass through the support section 6122 in the +Y direction, and a recess 6127, which is recessed toward the +Y-direction side from the −Y-direction-side surface of the supports section 6122, as shown in FIGS. 8 to 10.

The openings 6123 and 6124 are each formed in a roughly rectangular shape when viewed from the +Y-direction side. The protruding section 6116 described above is inserted into the opening 6123, and the shaft motion 6112 is inserted into the opening 6124.

The recess 6127 is formed in a roughly rectangular shape when viewed from the −Y-direction side, as shown in FIG. 10. The urged member 6113 described above is disposed in the recess 6127. A protrusion 6128, which positions the urging member 613X, and a protrusion 6129, which positions the urging member 613Z, protrude from the inner surface of the recess 6127. The urging member 613X is so disposed in the recess 6127 in the +X direction that the +X-direction-side end of the urging member 613X abuts against the inner surface of the recess 6127 and the −X-direction-side end of the urging member 613X abuts against the abutment surface 6114 of the urged member 6113 described above. Similarly, the urging member 613Z is so disposed in the recess 6127 in the +Z direction that the −Z-direction-side end of the urging member 613Z abuts against the inner surface of the recess 6127 and the +Z-direction-side end of the urging member 613Z abuts against the abutment surface 6115 of the urged member 6113.

The urging member 613X urges the urged member 6113 in the −X direction, and the urging member 613Z urges the urged member 6113 in the +Z direction.

When the urged member 6113 is urged, the shaft section 6112 abuts against the −X-direction-side inner surface 6125 of the opening 6124 described above and abuts against the +Z-direction-side inner surface 6126 of the opening 6124.

The opening 6124 is formed in a roughly rectangular shape when viewed in the −Y direction, as described above. The inner surface 6125 is a flat surface perpendicular to the +X direction, and the inner surface 6126 is a flat surface perpendicular to the +Z direction. Therefore, when the urging members 613X and 613Z press and urge the inner surfaces 6125 and 6126, the shaft section 6112 described above is positioned with no play. That is, the inner surface 6125 is a first positioning surface that determines the position of the shaft section 6112 in the +X direction, and the inner surface 6126 is a second positioning surface that determines the position of the shaft section 6112 in the +Z direction.

Configuration of Pivotal Motion Driver

Figure 11:
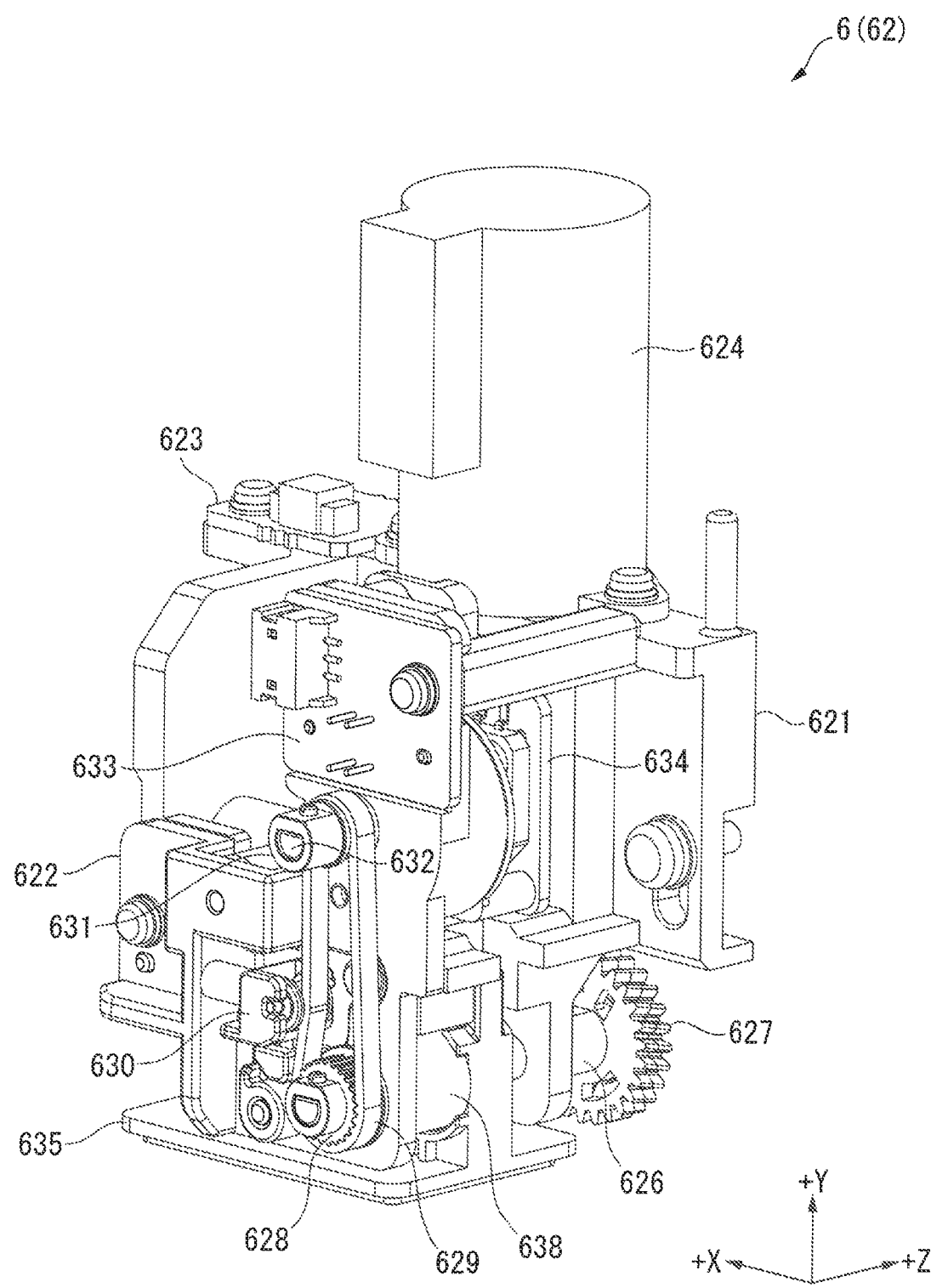
FIG. 11 is a perspective view of a pivotal motion driver in the first embodiment viewed from the light incident side.
Figure 12:
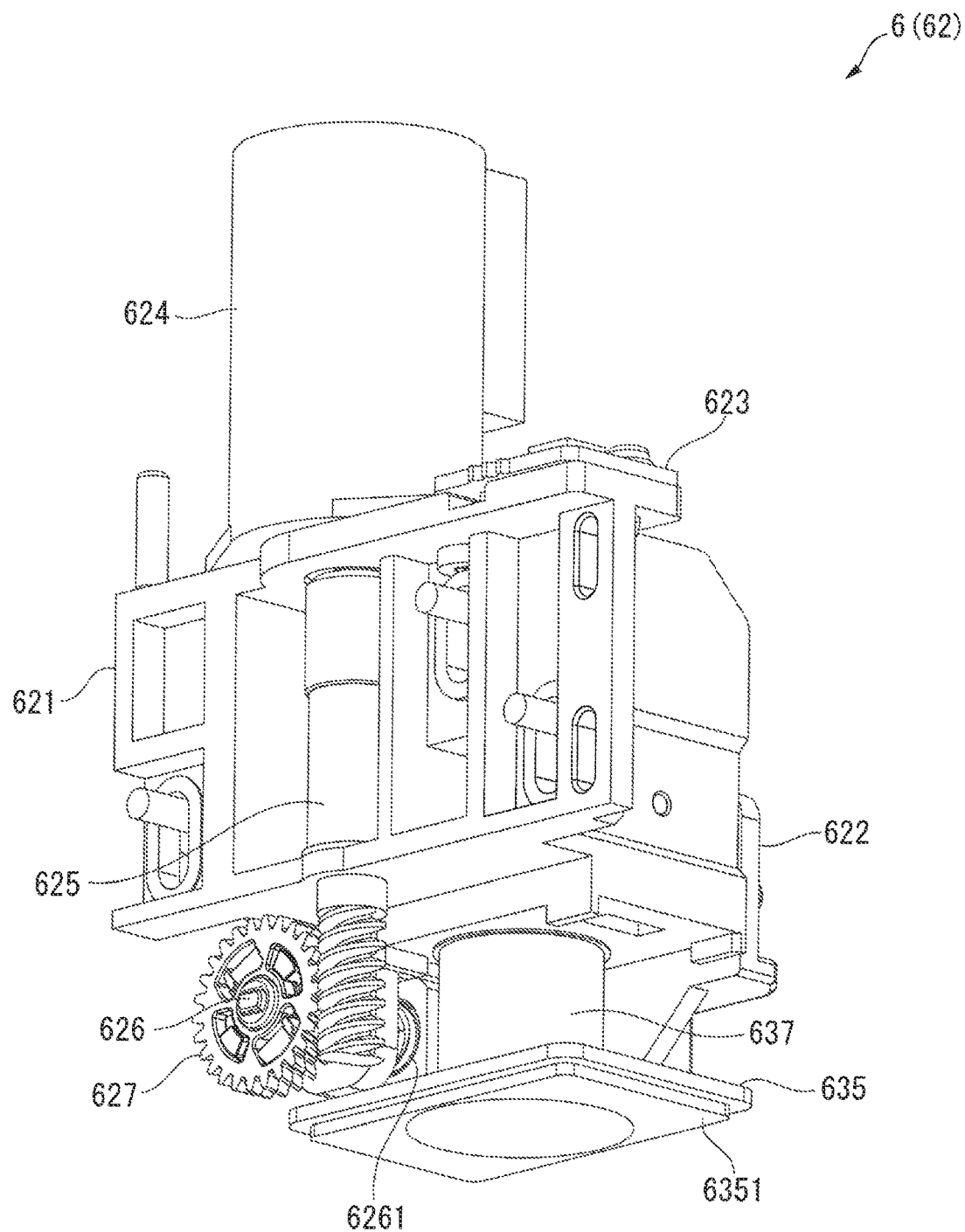
FIG. 12 is a perspective view of the pivotal motion driver in the first embodiment viewed from the light exiting side.
Figure 13:
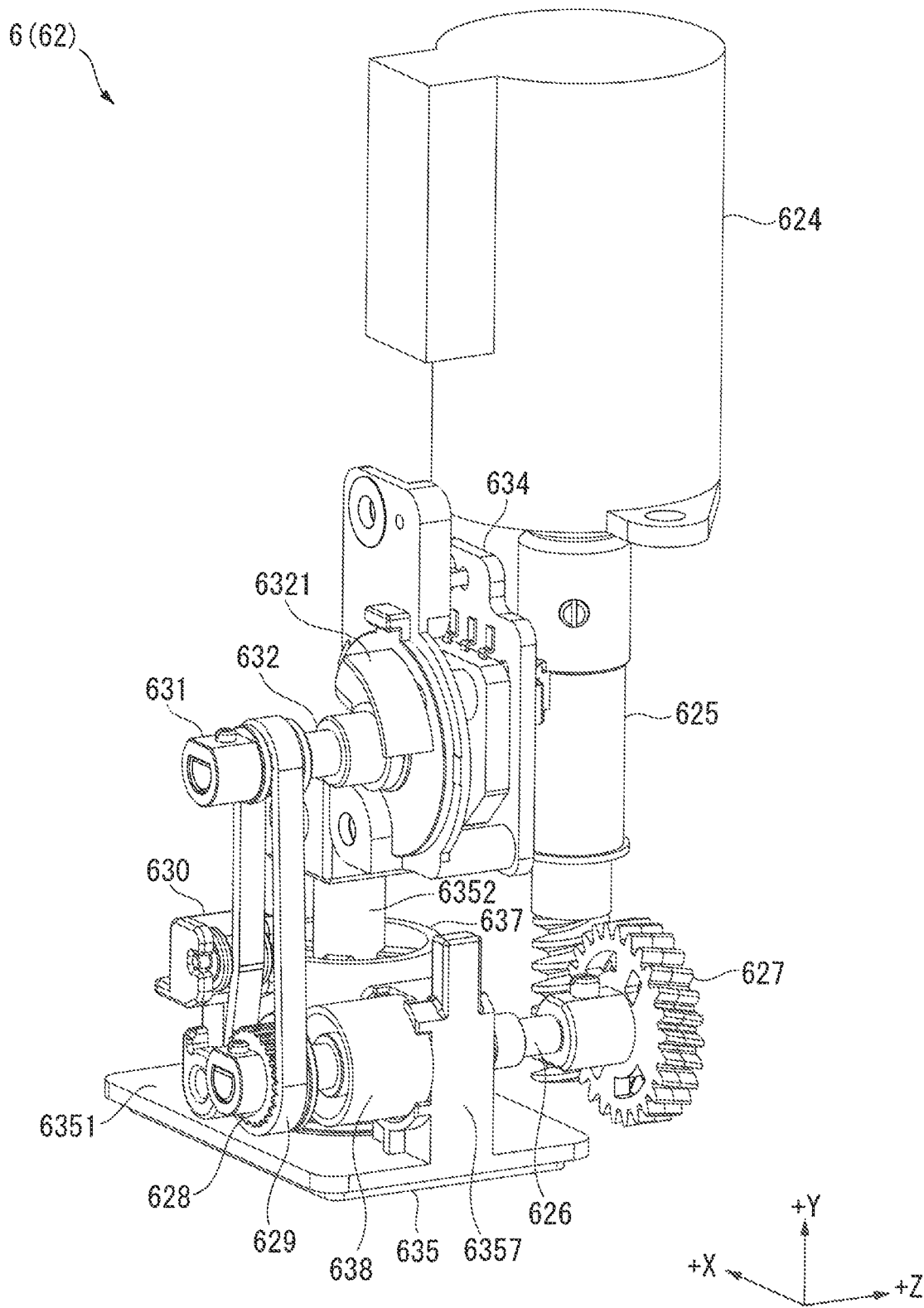
FIG. 13 is a perspective view of the pivotal motion driver in the first embodiment viewed from the light incident side.
Figure 14:
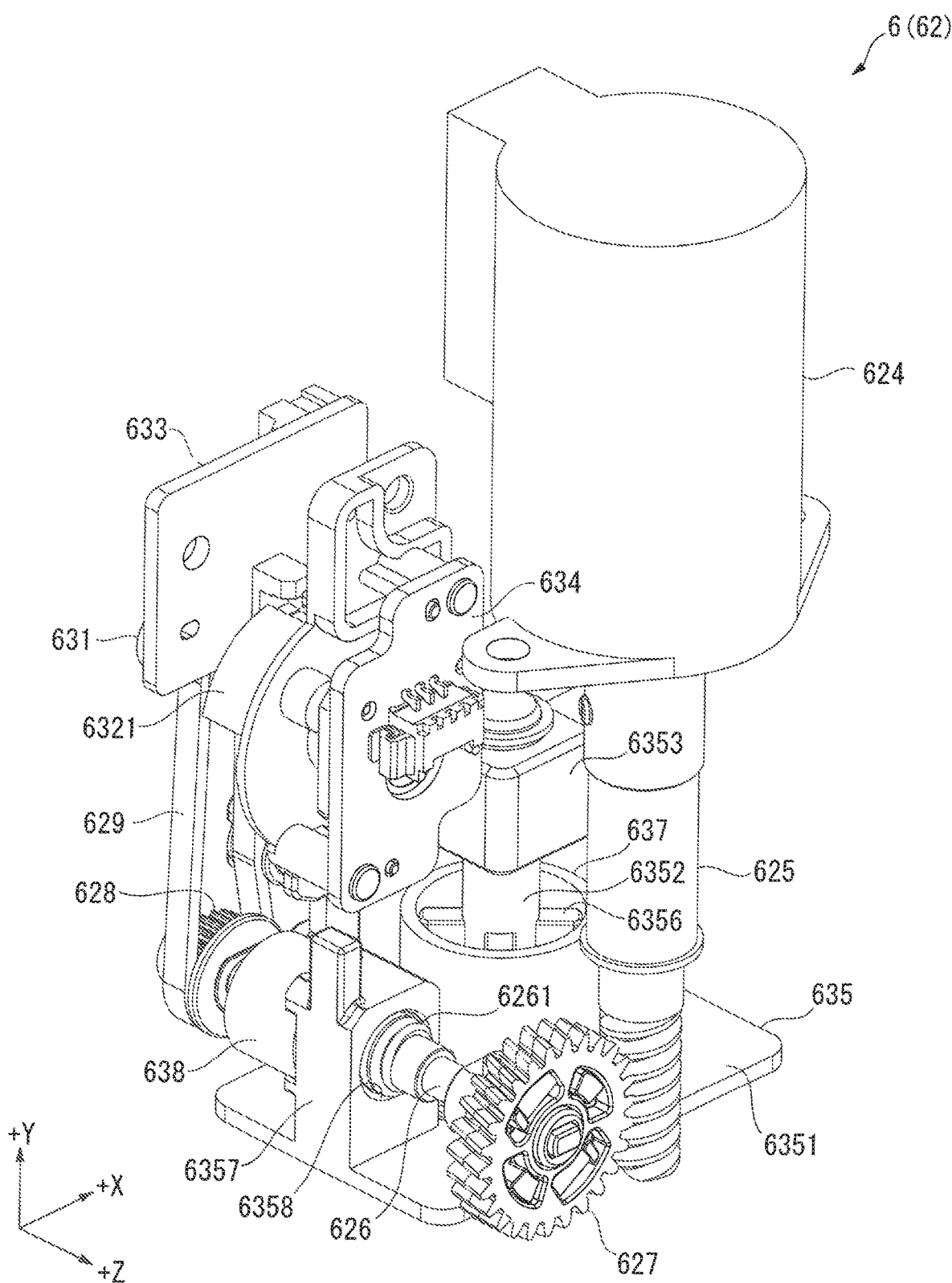
FIG. 14 is a perspective view of the pivotal motion driver in the first embodiment viewed from the light exiting side.

FIGS. 11 and 12 are perspective views of the pivotal motion driver 62 viewed from the light incident side (−Z-direction side) and the light exiting side (+Z-direction side), respectively. FIGS. 13 and 14 are perspective views of the pivotal motion driver 62 viewed from the light incident side and the light exiting side, respectively, with a first holding member 621, a second holding member 622, and a substrate 623 omitted.

The pivotal motion driver 62 causes the light combiner 456 to pivot around the pivotal axis Ry extending in the +Y direction. The pivotal motion driver 62 includes the first holding member 621 and the second holding member 622, the substrate 623 attached to the holding members 621 and 622, a motor 624, a worm gear 625, a lead screw 626, a worm wheel 627, a first pulley 628, a timing belt 629, a tensioner 630, a second pulley 631, a shaft member 632, a photosensor 633 and a potentiometer 634, a pivotal motion member 635 fixed to the light combiner 456, and urging members 636 (636X and 636Z), 637, and 638, as shown in FIGS. 11 to 14.

The first holding member 621 is fixed to the frame 71, which will be described later, with screws and holds, along with the second holding member 622, the components 623 to 634 described above. The first holding member 621 holds the second holding member 622, the substrate 623, the motor 624, a +Z-direction-side end portion of the lead screw 626, and the urging member 637, as shown in FIGS. 11 and 12. Further, the +Y-direction-side end of the urging member 637, which urges the pivotal motion member 635 in the −Y direction, abuts against the first holding member 621.

The second holding member 622 is located on the −Z-direction side of the first holding member 621 and combined with the first holding member 621. The second holding member 622 holds a −Z-direction-side end portion of the lead screw 626, the tensioner 630, the photosensor 633, and the potentiometer 634.

The substrate 623 drives the motor 624 based on a control signal inputted from the controller described above.

The motor 624 is a driver that produces drive force that causes the pivotal motion member 635, which is fixed to the light combiner 456, to pivot. The worm gear 625 is attached to the spindle (not shown) of the motor 624, as shown in FIGS. 12 to 14. In the present embodiment, a stepper motor that causes the spindle to pivot in accordance with an inputted pulse signal is employed as the motor 624.

The worm gear 625 is so disposed that the pivotal axis thereof extends in the +Y direction and is driven and rotated by the motor 624 described above. The worm gear 625 engages with the worm wheel 627. The lead screw 626, the worm wheel 627, and the pivotal motion member 635 in addition to the worm gear 625 form a pivotal motion apparatus that is driven by the motor 624 and causes the image formation unit FU to pivot around the pivotal axis Ry.

The lead screw 626 is so rotatably held by the first holding member 621 and the second holding member 622 described above that the pivotal axis of the lead screw 626 extends in the +Z direction and the lead screw 626 is immobile in the ±Z direction. The worm wheel 627 is fixed to the +Z-direction-side end of the lead screw 626, and the first pulley 628 is fixed to the −Z-direction-side end of the lead screw 626. The thus configured lead screw 626 has a helical groove 6261 around the outer circumference roughly at the center in the +Z direction, and the helical groove 6261 engages with the pivotal motion member 635, as shown in FIG. 14. A no-backlash gear is employed as the worm wheel 627 to avoid play between the worm gear 625 and the worm wheel 627.

When the worm gear 625 described above is caused to pivot, the thus configured lead screw 626 rotates along with the worm wheel 627, which engages with the worm gear 625. The pivotal motion member 635, which engages with the helical groove 6261, therefore pivots around the pivotal axis Ry.

When the lead screw 626 rotates, the first pulley 628, which is attached to the lead screw 626, also rotates in the same direction in which the lead screw 626 rotates.

The timing belt 629 is an annular belt that connects the first pulley 628 to the second pulley 631. The timing belt 629 transmits the rotation of the first pulley 628 to the second pulley 631. That is, the timing belt is a transmission member that transmits the pivotal motion of the first pulley 628 to the second pulley 631. In the present embodiment, a toothed belt (cogged belt) that engages with teeth (or grooves) formed in the circumferential surface of each of the first pulley 628 and the second pulley 631 is employed as the timing belt 629.

The tensioner 630 presses the timing belt 629, as shown in FIGS. 11 and 13, to prevent slack of the timing belt 629.

The second pulley 631 is fixed to the −Z-direction-side end of the shaft member 632. The second pulley 631 is a speed increasing gear that pivots at a higher speed than the first pulley 628, and the pivotal motion of the second pulley resulting from the pivotal motion of the first pulley 628 has an increased speed. That is, when the pivotal motion of the first pulley 628 is transmitted via the timing belt 629, the second pulley 631 is caused to pivot by a greater amount than the first pulley 628.

The shaft member 632 is so disposed along the +Z direction that the center axis thereof is parallel to the lead screw 626 described above and is caused to pivot along with the second pulley 631. The shaft member 632 is provided with a light blocker 6321, which blocks a light receiver of the photosensor 633 attached to the second holding member 622, as shown in FIGS. 11 and 14.

The shaft member 632 is connected to the potentiometer 634, as shown in FIGS. 13 and 14, and the potentiometer 634 detects the amount of pivotal motion of the shaft member 632 and hence the pivotal position of the pivotal motion member 635. The photosensor 633 and the potentiometer 634 correspond to the pivotal motion detection section.

A +Z-direction-side end portion of the shaft member 632 is formed in a spring shape that urges an opening (not shown) of the potentiometer 634, into which the end portion is inserted, in the direction in which the opening enlarges. The spring-shaped end portion prevents play between the shaft member 632 and the inner surface of the opening.

FIG. 15 is a perspective view of the lead screw 626 and the pivotal motion member 635 viewed from the light exiting side (−Z-direction side).

The pivotal motion member 635 is bonded and fixed to the +Y-direction-side surface 456U of the light combiner 456 and causes the light combiner 456 and hence the image formation unit FU to pivot around the pivotal axis Ry in response to the rotation of the lead screw 626. The thus functioning pivotal motion member 635 includes a plate-shaped section 6351, a shaft section 6352, an urged member 6353, protruding sections 6356, and an engagement section 6357, as shown in FIG. 15.

The plate-shaped section 6351 is formed in a roughly square plate shape when viewed from the +Y-direction side and, and the −Y-direction-side surface of the plate-shaped section 6351 is bonded and fixed to the surface 456Y described above.

The shaft section 6352 is a cylindrical portion that protrudes in the +Y direction roughly from the center of the plate-shaped section 6351. The shaft section 6352 serves as the pivotal axis Ry of the light combiner 456 (image formation unit FU). The position where the shaft section 6352 is formed is the position according to the center of the light combiner 456 when viewed in the −Y direction. In detail, the shaft section 6352 is disposed in the position that coincides with the above-mentioned center of the light combiner 456 when viewed from the −Y-direction side. That is, since the pivotal axis Ry coincides with an extension of the intersection line of the two dielectric multilayer films described above, the shaft section 6352 is located on the extension, as is the shaft section 6112 described above.

The urged member 6353, which has a roughly box-like shape, is fixed to the front end of the thus configured shaft section 6352, as is the shaft section 6112 described above.

The urged member 6353 is so urged by the urging members 636 (636X and 636Z) that the shaft section 6352 abuts against the inner surface of an opening 6212 of the first holding member 621.

The protruding sections 6356, which are plurally provided, radially protrude from the −Y-direction-side circumferential surface of the shaft section 6352. The protruding sections 6356 are each a portion that positions the urging member 637 (see FIGS. 12 to 14), the +Y-direction-side end of which abuts against the first holding member 621, and the urging member 637, which is a coil spring, is so disposed as to surround the protruding sections 6356. The −Y-direction-side end of the urging member 637 abuts against the +Y-direction-side surface of the plate-shaped section 6351 described above, so that the urging member 637 urges the pivotal motion member 635 and hence the light combiner 456 (image formation unit FU) toward the −Y-direction side (toward pivotal motion support section 61 described above).

Positioning of Shaft Section of Pivotal Motion Member

Figure 16:
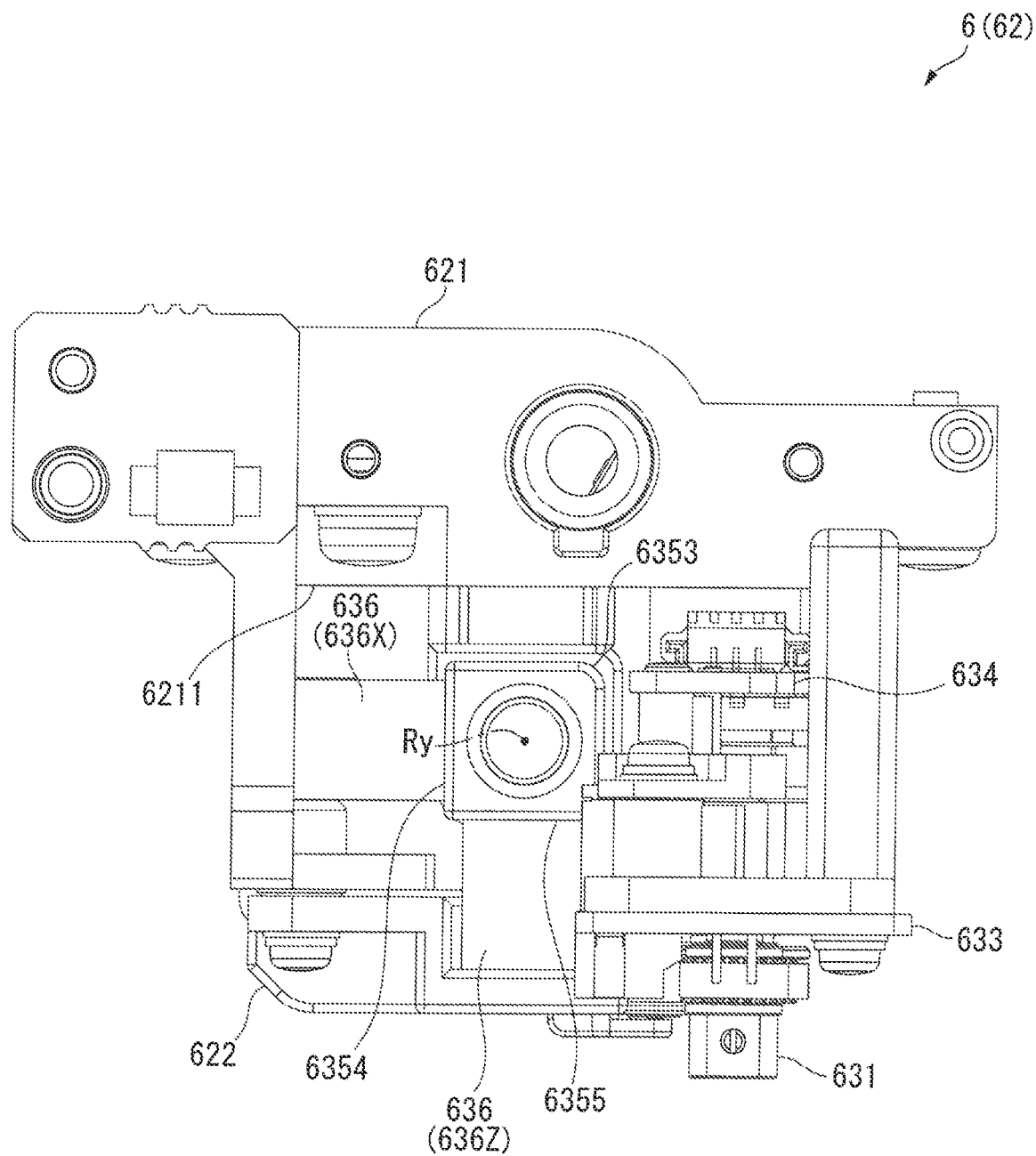
FIG. 16 shows the pivotal motion driver in the first embodiment.
Figure 17:
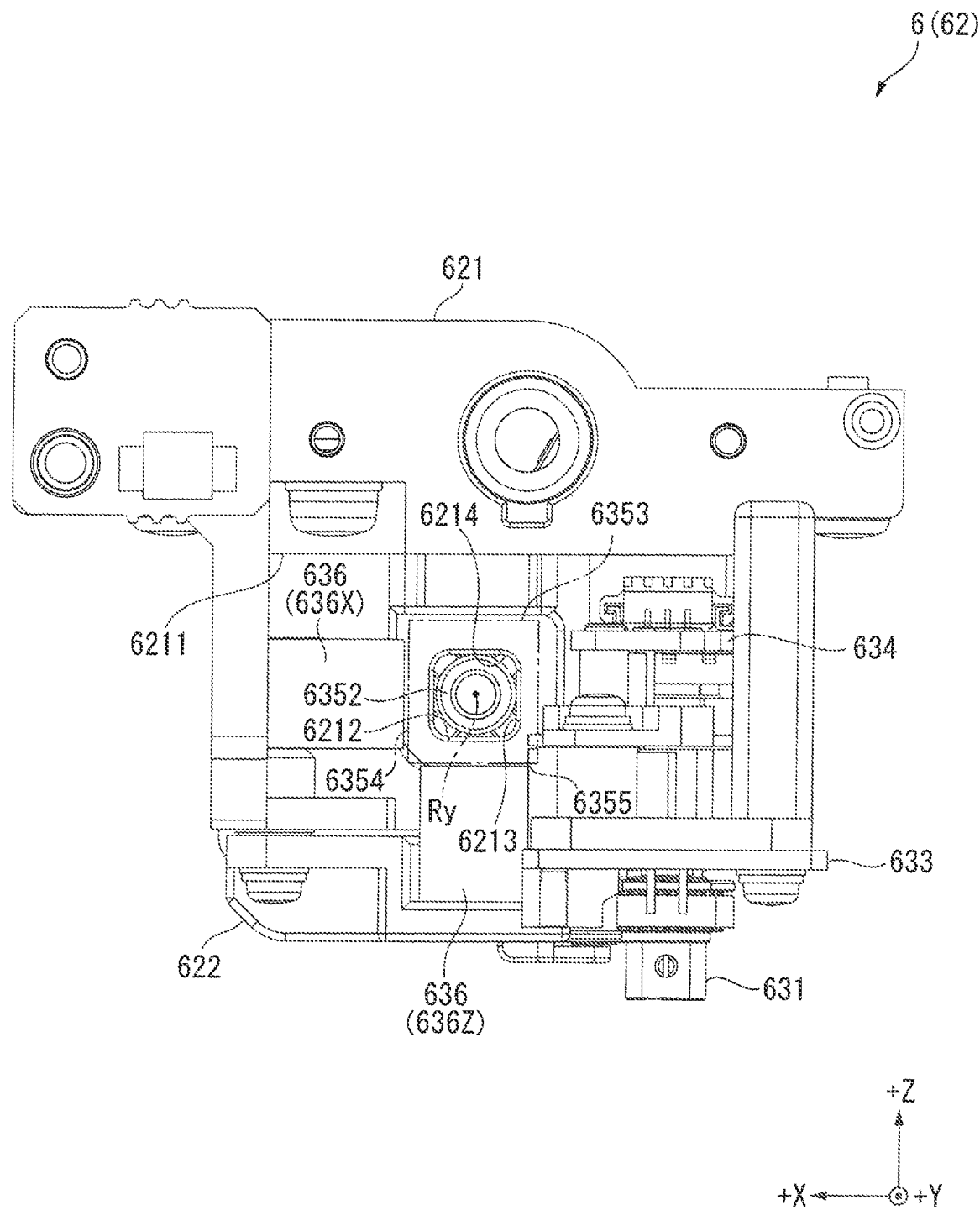
FIG. 17 shows the pivotal motion driver in the first embodiment.

FIGS. 16 and 17 show the pivotal motion driver 62 viewed from the +Y-direction side. It is noted that the motor 624 is omitted in FIGS. 16 and 17, and that the urged member 6353 is also omitted in FIG. 17.

The shaft section 6352 of the pivotal motion member 635 is also pressed and positioned against a flat surface perpendicular to the +X direction and a flat surface perpendicular to the +Z direction, as is the shaft section 6112 described above.

The first holding member 621 described above includes a recess 6211, which opens in the +Y direction, as shown in FIGS. 16 and 17, and the opening 6212, which is located at the bottom of the recess 6211 and passes through the first holding member 621 in the +Y direction, as shown in FIG. 17.

The shaft section 6352 described above is inserted into the opening 6212 from the −Y-direction side, as shown in FIG. 17, and the urged member 6353 fixed to the front end of the shaft section 6352 is disposed in the recess 6211, as shown in FIGS. 16 and 17.

The urging members 636X and 636Z are also disposed in the recess 6211.

The urging member 636X is so disposed along the +X direction that the +X-direction-side end thereof abuts against the inner surface of the recess 6211 and the −X-direction-side end thereof abuts against an abutment surface 6354, which is the +X-direction-side surface of the urged member

6353. The urging member 636X then urges the urged member 6353 in the −X direction.

The urging member 636Z is so disposed along the +Z direction that the −Z-direction-side end thereof abuts against the inner surface of the recess 6211 and the +Z-direction-side end thereof abuts against an abutment surface 6355, which is the −Z-direction-side surface of the urged member 6353. The urging member 636Z then urges the urged member 6353 in the +Z direction.

When the urging members 636X and 636Z urge the urged member 6353 in the −X and +Z directions, the shaft sections 6352, to which the urged member 6353 is fixed, abuts against an inner surface 6213, which is a flat surface perpendicular to the +X direction and located on the −X-direction side, and an inner surface 6214, which is a flat surface perpendicular to the +Z direction and located on the +Z-direction side, out of the inner surfaces of the opening 6212 having a roughly square shape when viewed from the +Y-direction side, as shown in FIG. 17.

As described above, the shaft section 6352 is pressed and urged by the urging members 636X and 636Z against the inner surfaces 6213 and 6214, and the shaft section 6352 is positioned with no play. That is, the inner surface 6213 functions as the first positioning surface that determines the position of the shaft section 6352 in the +X direction, and the inner surface 6214 functions as the second positioning surface that determines the position of the shaft section 6352 in the +Z direction.

The shaft sections 6112 and 6352, which each serve as the pivotal axis Ry, are urged by the urging members 613X and 636X in the −X direction and urged by the urging members 613Z and 636Z in the +Z direction. That is, the shaft sections 6112 and 6352 are urged in the same direction.

Configuration of Engagement Section of Pivotal Motion Member

The engagement section 6357 is a portion that engages with the helical groove 6261 of the lead screw 626 described above and is formed in a quadrangular tubular shape that circumferentially surrounds the lead screw 626, as shown in FIG. 15. That is, the engagement section 6357 has an opening 6358, into which the lead screw 626 is inserted along the +Z direction.

When the engagement section 6357 engages with the helical groove 6261, and the lead screw 626 therefore pivots around a pivotal axis extending in the +Z direction, the pivotal motion member 635 pivots around the shaft section 6352 described above, and hence the light combiner 456 (image formation unit) pivots around the pivotal axis Ry.

The engagement section 6357 has one end that abuts against the first holding member 621 (in detail, holding section that is part of first holding member 621 and holds −Z-direction-side end portion of lead screw 626) and the other end that is urged in the +Z direction by the urging member 638, which abuts against the engagement section 6357. The engagement section 6357 and the helical groove 6261 are therefore so maintained as to always abut against each other. The thus configured urging member 638 is formed of a coil spring that is disposed coaxially with the lead screw 626 in the present embodiment.

Figure 18:
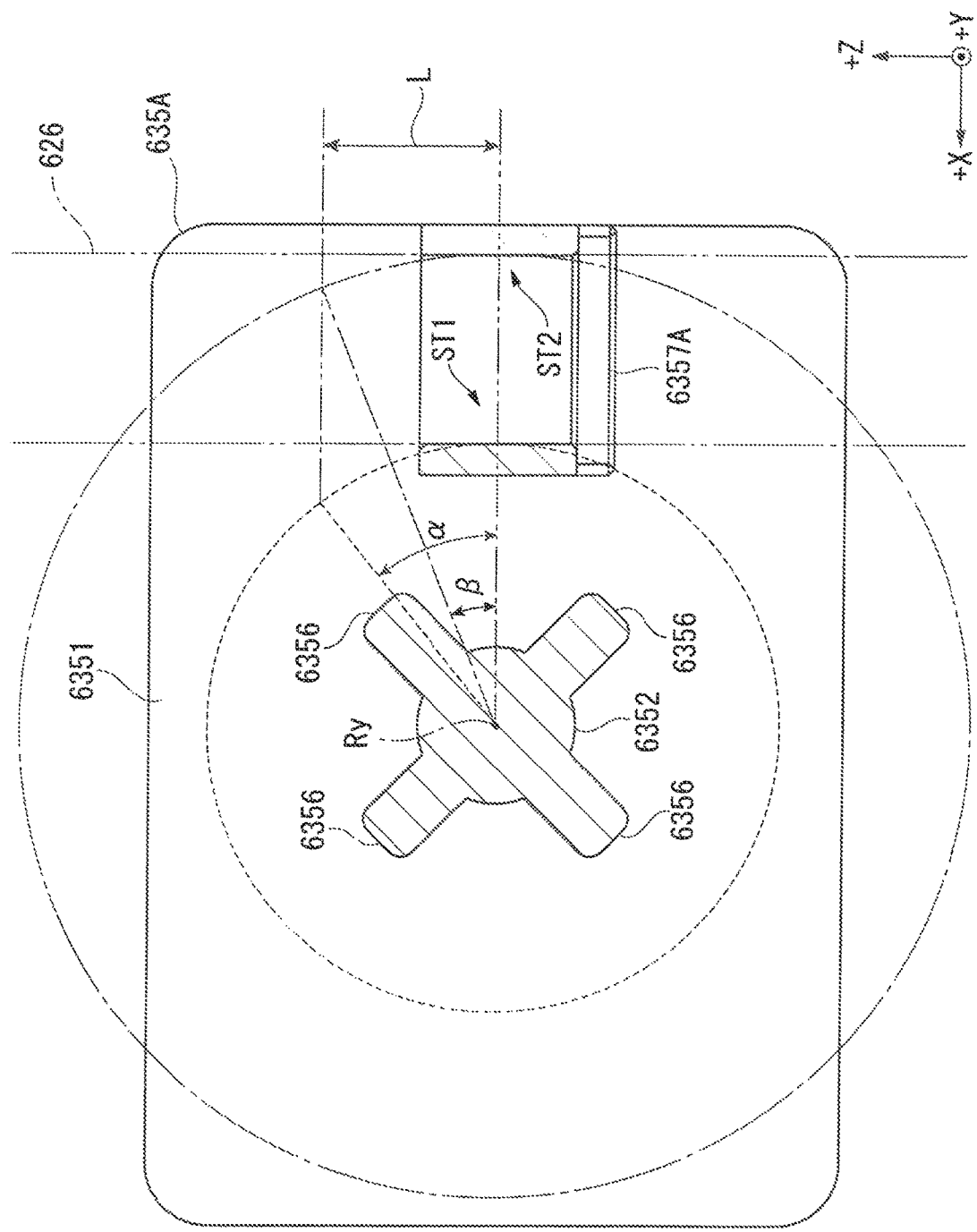
FIG. 18 shows the trajectory of a pivotal motion member that is a variation of the pivotal motion member in the first embodiment.

FIG. 18 shows the trajectory of the pivotal motion of a pivotal motion member 635A, which is a variation of the pivotal motion member 635. In FIG. 18, the dotted line represents the trajectory of a portion ST1 in the pivotal motion of the pivotal motion member 635A, the portion ST1 being part of the inner edge of the opening of an engagement section 6357A and closer to the shaft section 6352, and the chain line represents the trajectory of a portion ST2 in the pivotal motion of the pivotal motion member 635A, the portion ST2 being of part of the inner edge on and farther from the shaft section 6352.

The amount of pivotal motion (angle of pivotal motion) of the pivotal motion member 635 in a case where a portion of the thus configured engagement section 6357 or the portion that engages with the helical groove 6261 is the portion facing the shaft section 6352 (pivotal axis Ry) with respect to the lead screw 626 differs from the amount of pivotal motion in a case where the engagement portion is the portion opposite the shaft section 6352 with respect to the lead screw 626. The difference in the amount of pivotal motion will be described by using the pivotal motion member 635A, which is a variation of the pivotal motion member 635.

The pivotal motion member 635A has the same configuration as that of the pivotal motion member 635 except that the engagement section 6357 is replaced with the engagement section 6357A, as shown in FIG. 18.

The engagement section 6357A is formed in a quadrangular tubular shape that circumferentially surrounds the lead screw 626, as is the engagement section 6357, and has an opening through which the lead screw 626 is inserted along the +Z direction and teeth (not shown) that engage with the helical groove 6261 along the outer circumference of the lead screw 626. The engagement section 6357A can therefore engage with the helical groove 6261 in the portion ST1 facing the shaft section 6352 with respect to the lead screw 626, which is inserted through the engagement section 6357A, and in the portion ST2, which is opposite the shaft section 6352 with respect to the lead screw 626.

In the state in which the engagement section 6357A engages with the helical groove 6261 at the portion ST2, when the ST2 pivots in the +Z direction by a dimension L in response to the pivotal motion of the lead screw 626, the pivotal motion member 635A pivots by an angle β in the +Z direction around the pivotal axis Ry.

On the other hand, in the state in which the engagement section 6357A engages with the helical groove 6261 at the portion ST1, when the ST1 pivots in the +Z direction by the dimension L in response to the pivotal motion of the lead screw 626, the pivotal motion member 635A pivots by an angle α, which is greater than the angle β, in the +Z direction around the pivotal axis Ry. The reason for this is that the portion of the engagement section 6357A closer to the shaft section 6352 and the portion farther from the shaft section 6352 are both integrated with the plate-shaped section 6351, from which the shaft section 6352 protrudes.

As described above, in the case where the portion ST1 facing the shaft section 6352 with respect to the lead screw 626 engages with the helical groove 6261, the amount of pivotal motion (angle of pivotal motion) increases, as compared with the case where the portion ST2 opposite the shaft section 6352 with respect to the lead screw 626 engages with the helical groove 6261. That is, in the case where the portion where the helical groove 6261 engages with the engagement section 6357 is relatively close to the shaft section 6352, which serves as the pivotal axis Ry, the amount of pivotal motion of the pivotal motion member 635 increases, as compared with the case where the engagement portion is farther from the shaft section 6352. In other words, in the case where the portion ST1 closer to the shaft section 6352 engages with the helical groove 6261 via teeth 6359 formed in the engagement section 6357, the amount of pivotal motion of the pivotal motion member 635 increases, as compared with the case where the portion ST2 farther from the shaft section 6352 engages with the helical groove 6261.

When the amount of pivotal motion of the pivotal motion member 635A is greater than the amount of pivotal motion of the lead screw 626, it is difficult to make fine adjustment of the inclination of the pivotal motion member 635A and hence the light combiner 456. In other words, the configuration in which the portion ST2 described above engages with the helical groove 6261 allows the amount of pivotal motion of the pivotal motion member 635A to be smaller than the amount of pivotal motion of the lead screw 626, whereby fine adjustment of the inclination of the pivotal motion member 635A and hence the light combiner 456 can be made. The configuration in which the engagement section 6357 engages with the helical groove 6261 in a portion farther from the shaft section 6352 (outer portion of pivotal motion member 635) allows the amount of pivotal motion of the pivotal motion member 635A to be smaller than the amount of pivotal motion of the lead screw 626, whereby fine adjustment of the amount of pivotal motion of the pivotal motion member 635A can be made.

Figure 19:
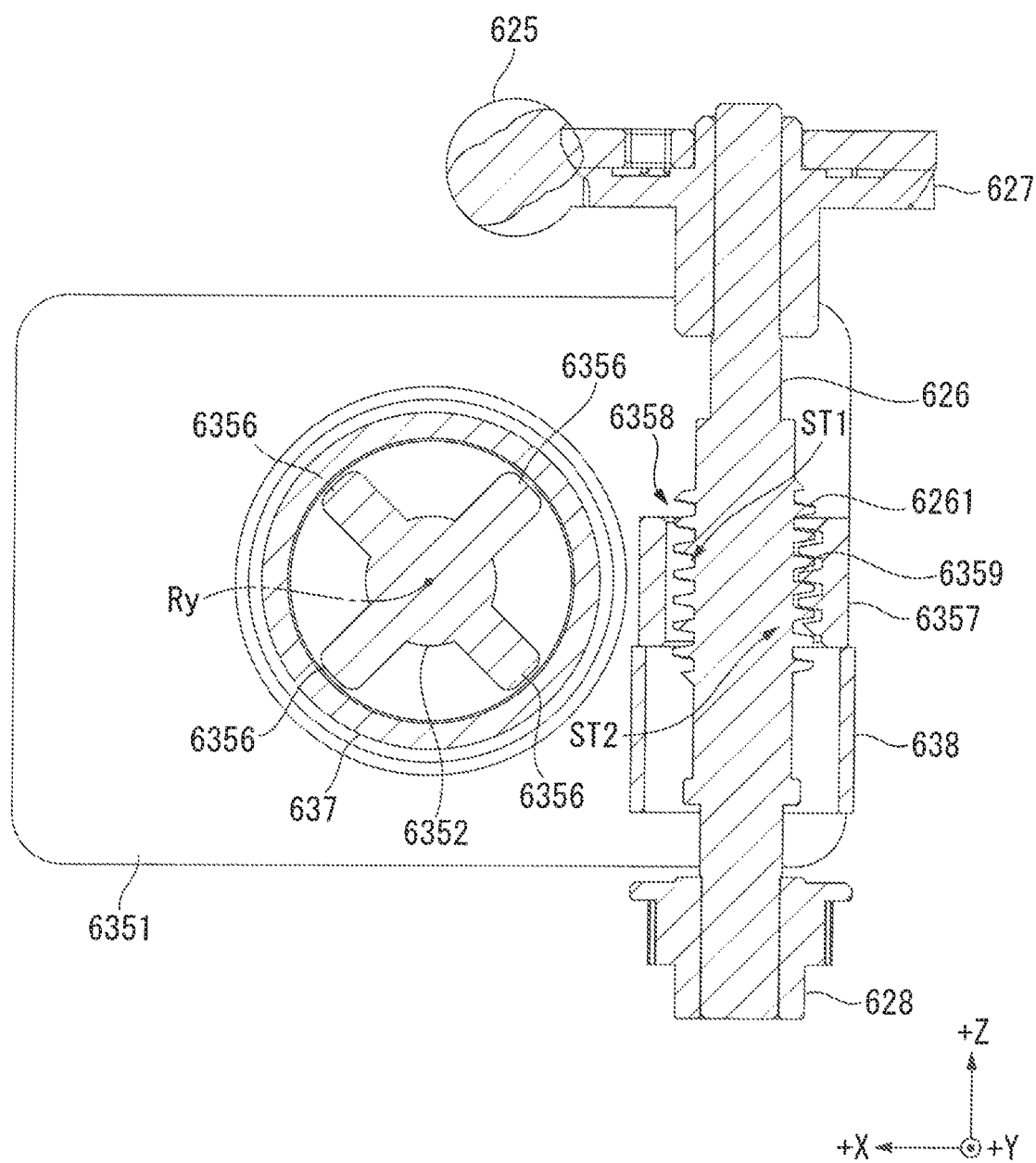
FIG. 19 shows the position where teeth in an engagement section in the first embodiment are formed.
Figure 20:
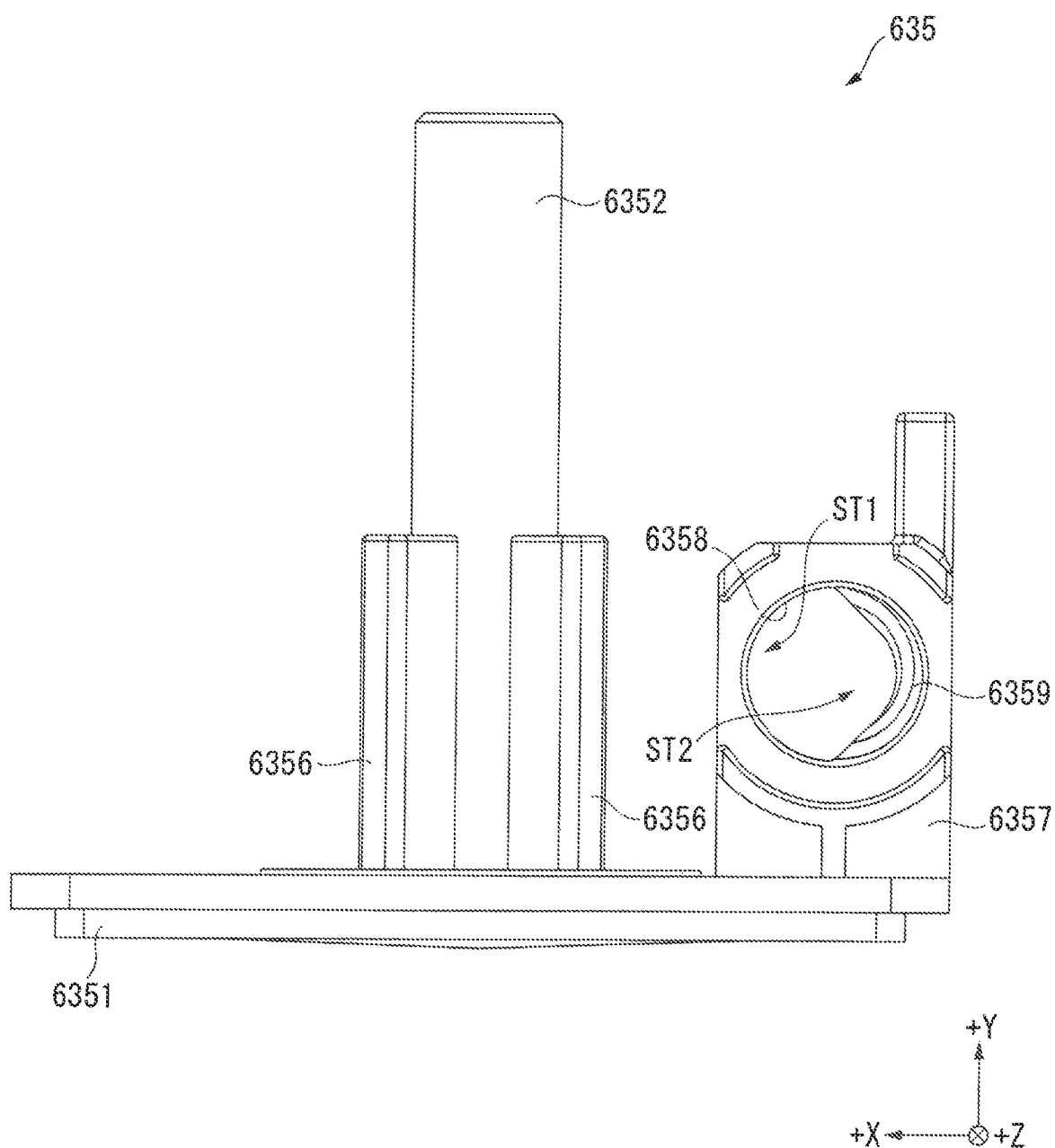
FIG. 20 shows the pivotal motion member in the first embodiment viewed from the light incident side.

FIG. 19 shows the position where the teeth 6359, which engage with the helical groove 6261, are formed in the engagement section 6357 of the pivotal motion member 635. In other words, FIG. 19 is a cross-sectional view of the lead screw 626 and the pivotal motion member 635 taken along an XZ plane in the portion where the helical groove 6261 engages with the teeth 6359. FIG. 20 shows the pivotal motion member 635 viewed from the light incident side (−Z-direction side).

In the present embodiment, in the opening 6358 of the engagement section 6357, the teeth 6359, which engage with the helical groove 6261, are formed in the portion ST2 opposite the shaft section 6352 (pivotal axis Ry) with respect to the lead screw 626, whereas no teeth 6359 are formed in the portion ST1 facing the shaft section 6352 with respect to the lead screw 626, as shown in FIGS. 19 and 20.

The engagement section 6357 therefore always engages with the helical groove 6261 in the portion ST2 of the engagement section 6357, which is farther from the shaft section 6352, (portion ST2 opposite the shaft section 6352 with respect to the lead screw 626). The amount of pivotal motion of the pivotal motion member 635 can therefore be smaller than the amount of pivotal motion of the lead screw 626, whereby fine adjustment of the amount of pivotal motion of the pivotal motion member 635 can be made.

Configuration of Pitch Pivotal Motion Section

Figure 21:
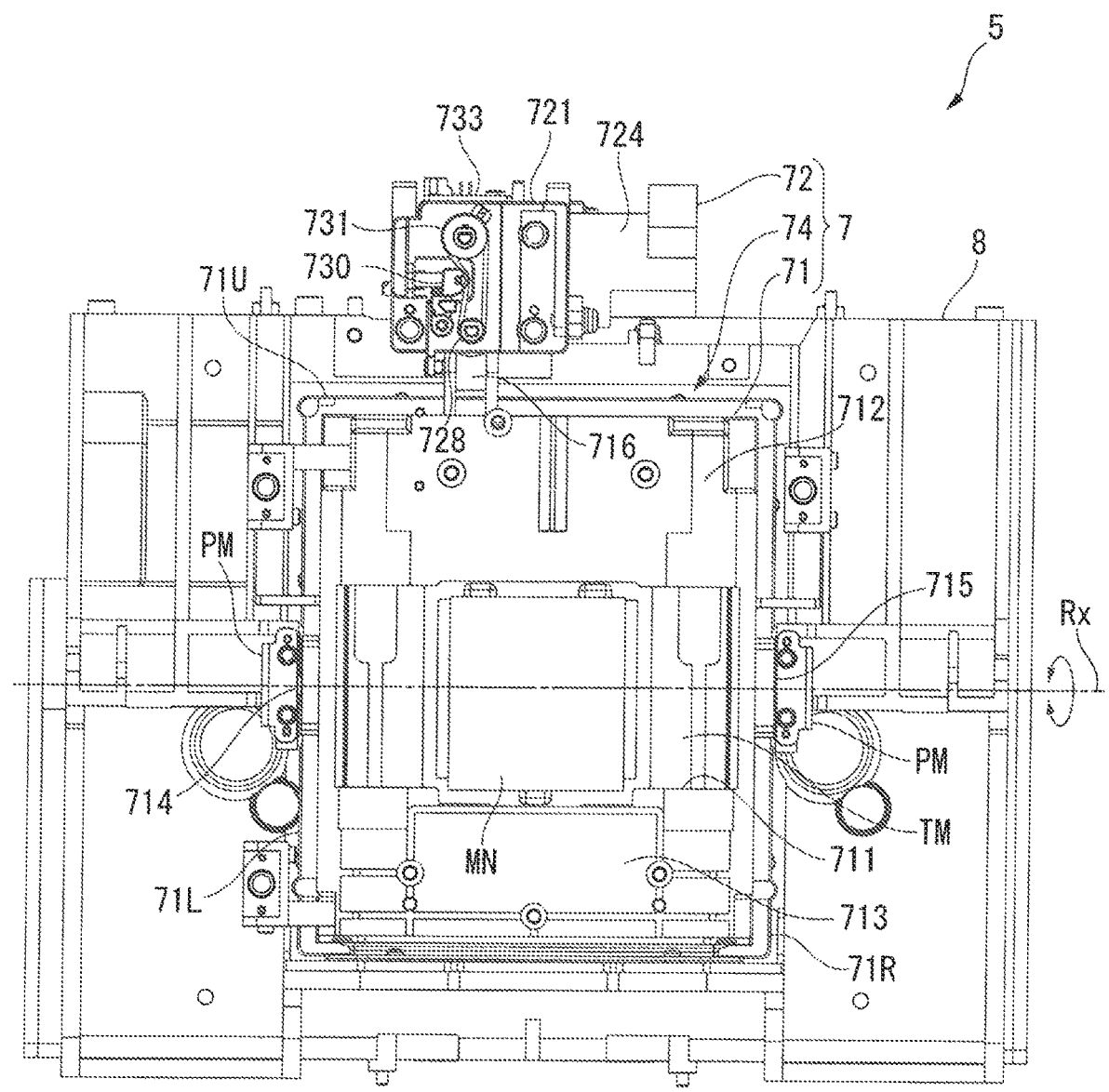
FIG. 21 shows the attitude adjustment apparatus in the first embodiment viewed from the light incident side.
Figure 22:
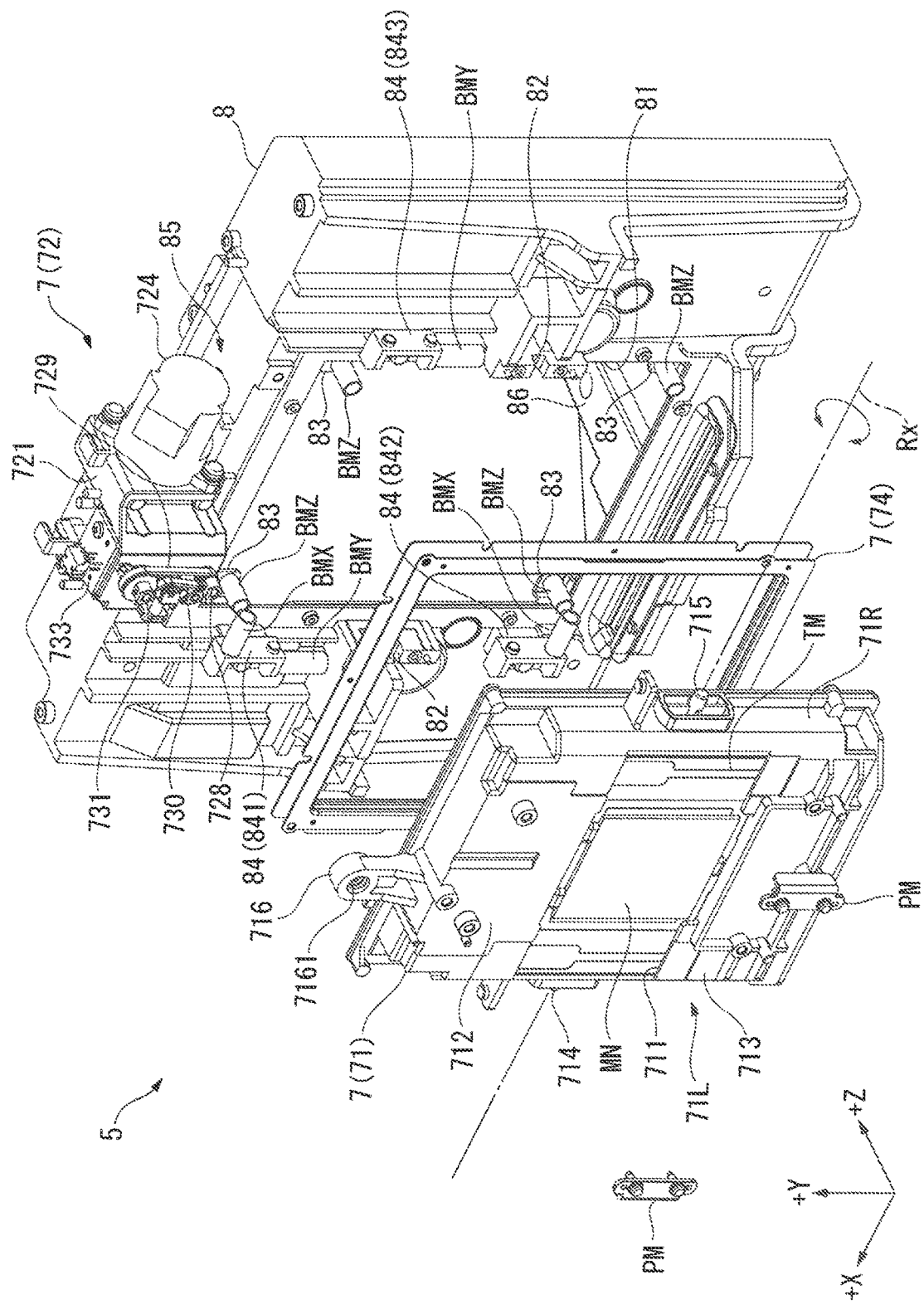
FIG. 22 is an exploded perspective view of the attitude adjustment apparatus in the first embodiment viewed from the light incident side.

FIG. 21 shows the attitude adjustment apparatus 5 viewed from the light incident side (−Z-direction side) with the yaw pivotal motion section 6 and the light combiner 456 removed, and FIG. 22 is a perspective view of the attitude adjustment apparatus 5 viewed from the light incident side.

The pitch pivotal motion section 7 is an X pivotal motion section that supports the yaw pivotal motion section 6, is supported by the support member 8, and causes the entire yaw pivotal motion section 6 and hence the image formation unit FU to pivot around the pivotal axis Ry extending in the +X direction, and the pitch pivotal motion section 7 corresponds to the first pivotal motion section. The pitch pivotal motion section 7 includes the frame 71, a pivotal motion mechanism 72, which causes the frame 71 to pivot, and a sealing member 74, which is disposed between the frame 71 and the support member 8, as shown in FIGS. 21 and 22.

The pivotal axis Rx is a pivotal axis roughly perpendicular to the optical axis of the projection optical apparatus 46 described above and parallel to the axis (first axis) passing through the centers of the modulation areas of the light modulators 452B and 452R.

Configuration of Frame

The frame 71 supports the yaw pivotal motion section 6 described above and is formed in a roughly oblong shape elongated in the +Y direction when viewed from the −Z-direction side. A recess (not shown) that is open toward the +Z-direction side is formed in the frame 71, and a holding member TM, which holds an optical part MN, such as a retardation film, is disposed in the recess.

The thus configured frame 71 has an opening 711, attachment sections 712 and 713, shaft sections 714 and 715, and an engagement section 716.

The opening 711 is an opening through which the image light outputted from the light combiner 456 passes in the +Z direction. The opening 711 is formed in a rectangular shape roughly at the center of the frame 71.

The attachment sections 712 and 713 are so positioned as to sandwich the opening 711 in the +Y direction. The first holding member 621 of the pivotal motion driver 62 is attached to the attachment section 712, which is located on the +Y-direction side, and the linkage member 612 of the pivotal motion support section 61 is attached to the attachment section 713, which is located on the −Y-direction side.

The shaft sections 714 and 715 are portions that form the pivotal axis Rx of the frame 71. The shaft section 714 has a cylindrical shape and protrudes from the +X-direction-side side surface 71L of the frame 71, and the shaft section 715 has a cylindrical shape and protrudes from the −X-direction-side side surface 71R of the frame 71. The shaft sections 714 and 715 are inserted from the −Z-direction side into grooves 82 (FIG. 22) formed in the support member 8 and extending in the +X direction, and pressing members PM are so attached to the support member 8 from the −Z-direction side as to cover the shaft sections 714 and 715, whereby the frame 71 is so supported by the support member 8 as to be pivotable around the shaft sections 714 and 715.

The positions where the shaft sections 714 and 715 are formed on the frame 71 are so set as to be located on the line that connects the centers of the image formation areas (modulation areas) of the liquid crystal panels 454 of the light modulators 452B and 452R, which form the image formation unit FU, when viewed in the +Z direction in the state in which the frame 71 does not pivot.

The engagement section 716 protrudes from the +Y-direction-side side surface 71U of the frame 71 toward the +Y-direction side and engages with the pivotal motion mechanism 72. In detail, the engagement section 716 has a female threaded hole 7161, which passes through the engagement section 716 in the +Z direction, and a lead screw 726, which forms the pivotal motion mechanism 72, is inserted into the female threaded hole 7161. When the lead screw 726 is caused to pivot and the engagement section 716 is moved in the +Z direction, the frame 71 pivots around the shaft sections 714 and 715 described above.

Configuration of Pivotal Motion Mechanism

Figure 23:
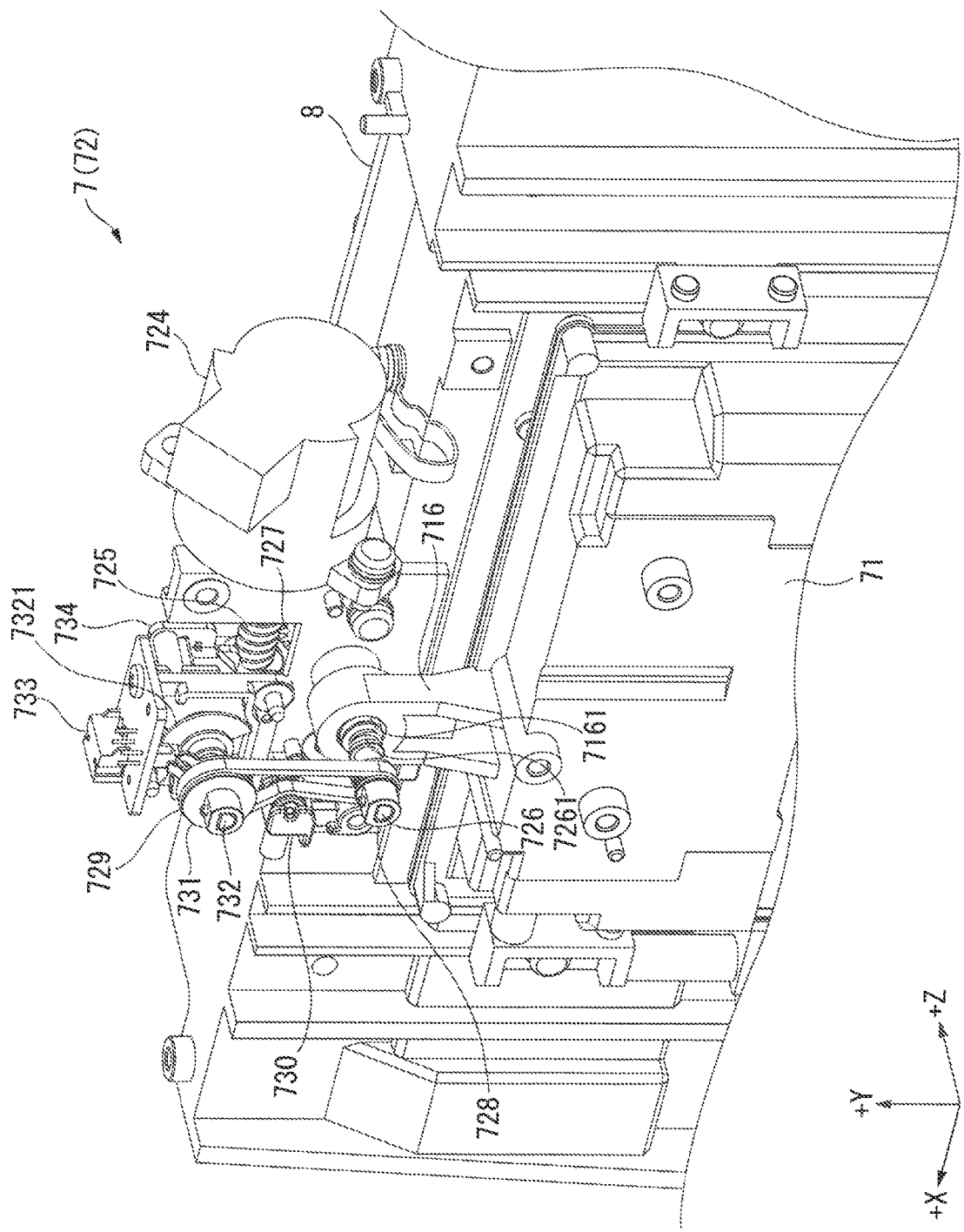
FIG. 23 is an enlarged perspective view showing a pivotal motion mechanism in the first embodiment.
Figure 24:
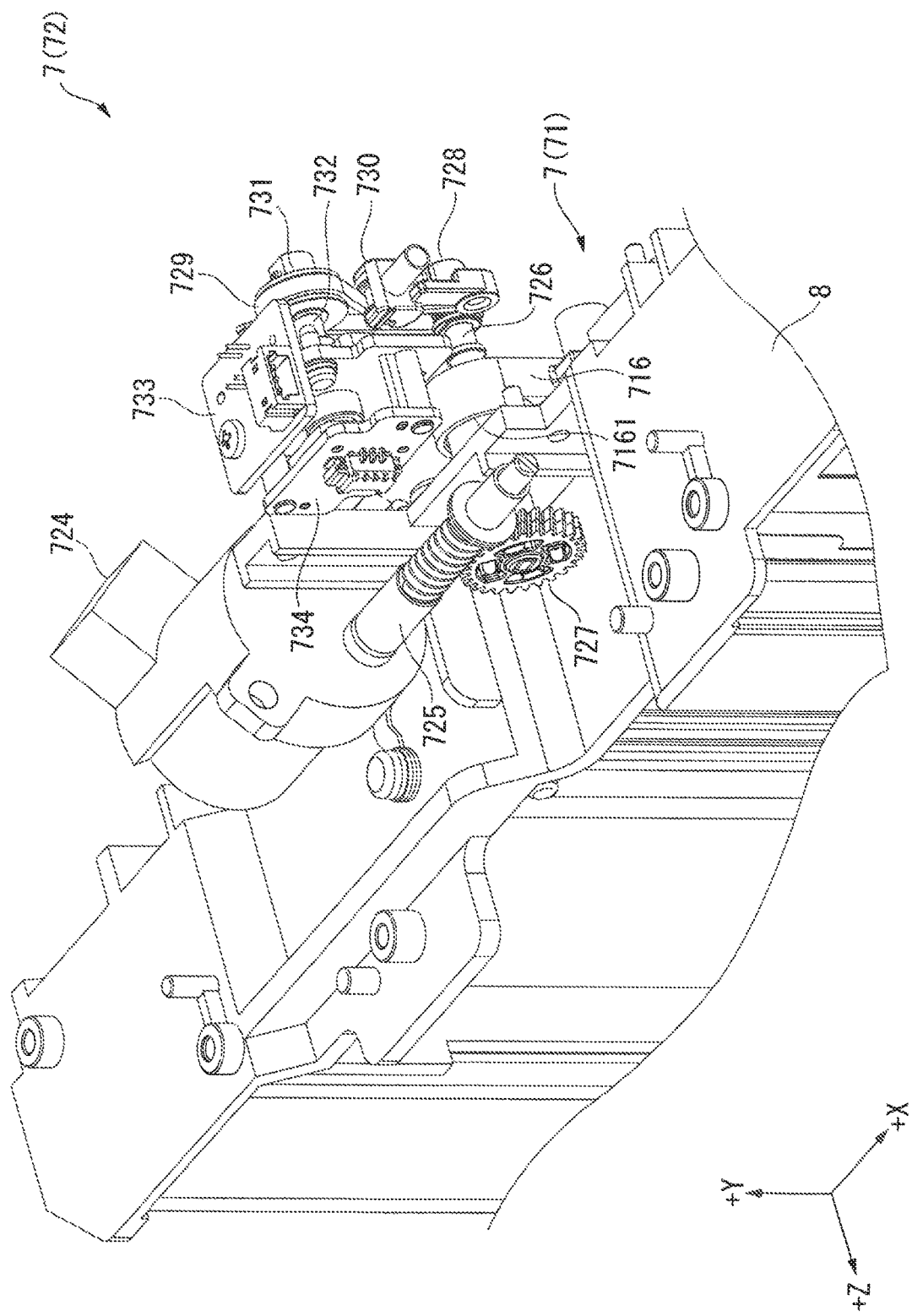
FIG. 24 is an enlarged perspective view showing the pivotal motion mechanism in the first embodiment.

FIGS. 23 and 24 are enlarged perspective views showing the pivotal motion mechanism 72. In detail, FIG. 23 is a perspective view of the pivotal motion mechanism 72 viewed from the light incident side (−Z-direction side), and FIG. 24 is a perspective view of the pivotal motion mechanism 72 viewed from the light exiting side (+Z-direction side). In FIGS. 23 and 24, a holding member 721, which holds the pivotal motion mechanism 72, is omitted.

The pivotal motion mechanism 72 has the same configuration as that of the pivotal motion driver 62 described above, moves the engagement section 716 described above in the ±Z direction to cause the frame 71 described above to pivot around the pivotal axis Ry, whereby the image formation unit FU is caused to pivot around the pivotal axis Ry.

The thus configured pivotal motion mechanism 72 includes not only the holding member 721, as shown in FIGS. 21 and 22, but a motor 724, a worm gear 725, the lead screw 726, a worm wheel 727, a first pulley 728, a timing belt 729, a tensioner 730, a second pulley 731, a shaft member 732, a photosensor 733, and a potentiometer 734, as shown in FIGS. 23 and 24.

The holding member 721 holds the components 724 to 734 described above and is attached to the support member 8.

The motor 724 is a stepper motor driven in accordance with an inputted pulse signal and is a driver that produces drive force that causes the frame 71 to pivot. The motor 724 is so disposed that the spindle (not shown) thereof extends in the +X direction.

The worm gear 725 is attached to the spindle of the motor 724. The worm gear 725, the lead screw 726, the worm wheel 727, and the frame 71 form a pivotal motion apparatus that causes the image formation unit FU to pivot, as in the case described above.

The lead screw 726 is a shaft-shaped member disposed along the +Z direction and so supported by the holding member 721 described above as to be pivotable around a pivotal axis extending in the +Z direction with the lead screw 726 immobile in the ±Z direction. The worm wheel 727 is fixed to the +Z-direction-side end of the lead screw 726, and the first pulley 728 is fixed to the −Z-direction-side end of the lead screw 726. A helical groove 7261, which engages with the female threaded hole 7161 of the engagement section 716 described above, is formed at the center of the lead screw 726 in the +Z direction.

When the motor 724 is driven so that the worm gear 725 is caused to pivot, the lead screw 726 is caused to pivot integrally with the worm wheel 727, which engages with the worm gear 725. As a result, the frame 71 (engagement section 716), which engages with the lead screw 726, is moved in the ±Z direction, and the frame 71 is caused to pivot as described above.

In the case of the engagement section 6357 of the pivotal motion member 635, the teeth 6359, which engage with the helical groove 6261 of the lead screw 626, are provided only on the side opposite the shaft section 6352 via the lead screw 626, that is, the side opposite the shaft section 6352 with respect to the lead screw 626. On the other hand, in the case of the engagement section 716 of the frame 71, the teeth of the female threaded hole 7161 are formed over the entire inner circumference of the female threaded hole 7161.

The reason for this is that since the engagement section 6357 and the helical groove 6261 engage with each other in a position relatively close to the shaft section 6352, the position of the teeth 6359 with respect to the helical groove 6261 greatly changes the amount of pivotal motion of the pivotal motion member 635, whereas since the female threaded hole 7161 and the helical groove 7261 engage with each other in a position relatively separate from the shaft sections 714 and 715, the amount of pivotal motion of the frame 71 does not greatly vary irrespective of the portion of the female threaded hole 7161 that engages with the helical groove 7261.

The timing belt 729 is a toothed belt that connects the first pulley 729 to the second pulley 731 and transmits the pivotal motion of the first pulley 728 to the second pulley 731.

The tensioner 730 presses the timing belt 729 to prevent slack of the timing belt 729.

The second pulley 731 is a speed increasing gear that pivots at a higher speed than the first pulley 728, as is the second pulley 631 described above, and when the pivotal motion of the first pulley 728 is transmitted via the timing belt 729, the second pulley 731 is caused to pivot by a greater amount than the first pulley 728.

The shaft member 732 is so disposed along the +Z direction that the center axis thereof is parallel to the lead screw 726. The shaft member 732 is provided with a light blocker 7321, which blocks a light receiver of the photosensor 733 disposed on the +Y-direction-side of the shaft member 732.

The shaft member 732 is connected to the potentiometer 734, and the potentiometer 734 detects the amount of pivotal motion of the shaft member 732 and hence the pivotal position of the frame 71.

In the thus configured pivotal motion mechanism 72, when the worm gear 725 attached to the motor 724 is caused to pivot around the pivotal axis extending in the +X direction, the lead screw 726 pivots along with the worm wheel 727, which engages with the worm gear 725. Since the helical groove 7261 of the lead screw 726 engages with the female threaded hole 7161 of the engagement section 716, the engagement section 716 moves in the ±Z direction, whereby the frame 71 pivots around the shaft sections 714 and 715 (pivotal axis Rx).

The pivotal motion of the lead screw 726 is transmitted to the shaft member 732, which is provided with the second pulley 731, via the first pulley 728 and the timing belt 729. The pivotal motion of the shaft member 732 is detected with the potentiometer 734. Further, light blocking performed by the light blocker 7321 provided as part of the shaft member 732 is detected with the photosensor 733, and the result of the detection is used to allow the frame 71 to return to the origin thereof.

Configuration of Sealing Member

The sealing member 74 seals the gap between the frame 71 and the support member 8 to prevent a gas containing dust and other substances in the space on the +Z-direction side of the support member 8 from entering the −Z-direction-side space thereof (space on the side where the image formation unit FU is disposed), as shown in FIG. 22. The sealing member 74 is made of an elastic material, is formed in a rectangular frame shape when viewed from the −Z-direction side, and has a roughly U-letter-shaped cross section. The −Z-direction-side surface of the sealing member 74 is connected to the circumferential edge of the +Z-direction-side surface of the frame 71, and the +Z-direction-side surface of the sealing member 74 is connected to the support member 8. The surface that connects these +Z-direction-side surfaces to each other is a restriction surface that restricts entry of dust.

As described above, the frame 71 is supported by the support member 8 and caused to pivot around the pivotal axis Rx described above. A gap that allows the frame 71 to pivot therefore needs to be provided between the frame 71 and the support member 8. In a case where dust having entered the exterior enclosure 2 enters a deeper interior via the gap and adheres to the image formation unit FU or any other optical part, a displayed image is likely to deteriorate due, for example, to a displayed shadow of the dust, and an optical part to which the dust has adhered is likely to be heated, resulting in accelerated degradation of the optical part.

In contrast, the sealing member 74, which seals the gap described above, prevents dust from entering the −Z-direction-side of the support member 8, whereby the deterioration of the displayed image described above and the degradation of the optical part are avoided.

Configuration of Support Member

The support member 8 supports the pitch pivotal motion section 7 and hence supports the yaw pivotal motion section 6 and the image formation unit FU and is formed in a roughly rectangular shape elongated in the +X direction when viewed from the −Z-direction side, as shown in FIG. 22. The support member 8 includes an opening 81, the grooves 82, attachment sections 83, 84, and 85, and a fixing section 86.

The opening 81 is so formed at the center of the support member 8 in a rectangular shape elongated in the +Y direction as to pass through the support member 8 in the +Z direction. The opening 81 is an opening through which the image light outputted from the image formation unit FU described above passes, and the image light enters the projection optical apparatus 46 attached to the support member 8.

The grooves 82 are formed along the +X direction in positions on the ±X-direction-sides of the opening 81. The shaft sections 714 and 715 described above are inserted into the groove 82 from the −Z-direction side. The pressing members PM is so attached to the support member 8 as to cover the shaft sections 714 and 715 from the −Z-direction side, whereby the frame 71 is pivotably supported by the support member 8.

The attachment sections 83 are provided at the four corners of the opening 81, which is formed in a rectangular shape. Urging members BMZ, which urge the frame 71 in the −Z direction, are attached to the respective attachment sections 83.

The attachment sections 84 are so provided that two of the attachment sections 84 are provided in positions that are located on the +X-direction-side of the opening 81 and sandwich the corresponding groove 82 in the +Y direction and one of the attachment sections 84 is provided on the −X-direction-side of the opening 81 and in a position on the +Y-direction-side of the corresponding groove 82. An urging member BMX, which urges the frame 71 in the −X direction, and an urging member BMY, which urges the frame in the −Y direction, are attached to one of the attachment sections 84 or the attachment section 841 located on the +X-direction side and the +Y-direction side. Another urging member BMX, which urges the frame 71 in the −X direction, is attached to the attachment section 842 located on the +X-direction side and the −Y-direction side. Further, another urging member BMY, which urges the frame in the −Y direction, is attached to the attachment section 843 located on the −X-direction side. The urging members BMX, BMY, and BMZ prevent play of the frame 71 with the shaft sections 714 and 715 disposed in the grooves 82.

The attachment section 85 is located on the +Y-direction-side side surface of the support member 8. The pivotal motion mechanism 72 (holding member 721) described above is attached to the attachment section 85.

The fixing section 86 extends in the +Z direction from the −Y-direction-side end of the support member 8. The fixing section 86 is a portion for fixing the support member 8 to a base member (not shown) provided along the bottom surface section described above in the exterior enclosure 2.

The projector 1 according to the present embodiment described above can provide the following effects.

The attitude adjustment apparatus 5 causes the image formation unit FU to pivot around the pivotal axes Rx and Ry perpendicular to the optical axis of the projection optical apparatus 46 to cause the light modulators 452 to pivot. The attitude (inclination) of the light modulators 452 with respect to the projection optical apparatus 46 can therefore be adjusted, whereby the light modulators 452 can be positioned adequately for the projection optical apparatus 46. Occurrence of the one-side defocus described above can therefore be avoided, whereby deterioration of a displayed image can be avoided.

Further, since the thus configured attitude adjustment apparatus 5 inclines the image formation unit FU, which is lighter than the projection optical apparatus 46, the problems described above that occur when the projection optical apparatus 46 is inclined can be avoided.

The image formation apparatus 45 includes the image formation unit FU, which is formed of the plurality of the light modulators 452 integrated with the light combiner 456, and the attitude adjustment apparatus 5 causes the image formation unit FU to pivot around the pivotal axes Rx and Ry to adjust the attitude of each of the light modulators 452. As a result, the attitudes of the plurality of the light modulators 452 integrated with the light combiner 456 can be simultaneously adjusted. The attitude adjustment (inclination adjustment) of the light modulators 452 can therefore be readily performed.

The light combiner 456 has the light incident surfaces 456B and 456R, which are located on opposite sides of the light combiner 456, the light incident surface 456G, which intersects the light incident surfaces 456B and 456R, and the light exiting surface 456E, which is located on the side opposite the light incident surface 456G with respect to the light combiner 456. The image formation apparatus 45 includes the light modulator 452B, which serves as the first light modulator facing the light incident surface 456B, the light modulator 452R, which serves as the second light modulator facing the light incident surface 456R, and the light modulator 452G, which serves as the third light modulator facing the light incident surface 456G. The pivotal axis Rx is roughly perpendicular to the optical axis of the projection optical apparatus 46 and parallel to the axis X (first axis) passing through the centers of the modulation areas of the light modulators 452B and 452R, and the pivotal axis Ry is roughly perpendicular to the optical axis of the projection optical apparatus 46 and parallel to the axis Y (second axis) perpendicular to the axis X. Since the first and second axes are therefore defined based on the configurations and arrangement of the light modulators 452 and the light combiner 456, the pivotal axes Rx and Ry parallel to the first and second axes can be readily defined. Further, the configuration and arrangement of the attitude adjustment apparatus 5, which causes the image formation unit FU to pivot around the thus defined pivotal axes Rx and Ry, can be readily designed.

The pivotal axis Ry is parallel to the axis Y, passes through the center of the modulation area of the light modulator 452G, and passes through the intersection of the axis Z parallel to the optical axis of the projection optical apparatus 46 and the axis X passing through the centers of the modulation areas of the light modulators 452B and 452R. That is, the pivotal axis Ry is a pivotal axis parallel to the axis Y and passing through the center of the light combiner 456. The amount of movement of the image formation unit FU (light modulators 452) can be reduced in the case described above as compared with a case where the pivotal axis Ry does not pass through the center of the light combiner 456, provided that the image formation unit FU inclines with respect to the projection optical apparatus 46 by the same amount. That is, the amount of movement of the image formation unit FU (light modulators 452) can be reduced in the case where the pivotal axis Ry passes through the center of the light combiner 456 as compared with the case where the pivotal axis Ry does not pass through the center of the light combiner 456, provided that the image formation unit FU inclines by the same amount. Therefore, since the margin of the light flux incident on each of the light modulators 452 (illumination margin) can be reduced, the light outputted from the light source apparatus 41 and used to form an image can be used at increased efficiency.

The attitude adjustment apparatus 5 includes the pitch pivotal motion section 7, which serves as the first pivotal motion section and causes the light combiner 456 to pivot around the pivotal axis Rx parallel to the axis X, and the yaw pivotal motion section 6, which serves as the second pivotal motion section and causes the light combiner 456 to pivot around the pivotal axis Ry parallel to the axis Y. The range over which the attitude of the image formation unit FU is adjusted can therefore be increased as compared with a case where the attitude adjustment apparatus 5 includes only one of the yaw pivotal motion section 6 and the pitch pivotal motion section 7. The attitude of each of the light modulators 452 can therefore be adjusted to an attitude that prevents occurrence of the one-side defocus described above.

The yaw pivotal motion section 6 as the second pivotal motion section causes the light combiner 456 to pivot around the pivotal axis passing through the intersection of the axis passing through the center of the modulation area of the light modulator 452G and parallel to the optical axis of the projection optical apparatus 46 and the axis X passing through the centers of the modulation areas of the light modulators 452B and 452R. Further, the pitch pivotal motion section 7 as the first pivotal motion section supports the yaw pivotal motion section 6 and causes the yaw pivotal motion section 6 to pivot to cause the light combiner 456 and hence the light modulators 452 to pivot. As a result, the light use efficiency can be increased as described above, and the pitch pivotal motion section 7, which supports the yaw pivotal motion section 6, allows the pivotal axis of the yaw pivotal motion section 6 to be readily set as described above. Therefore, in the attitude adjustment apparatus 5 having both the pivotal axis parallel to the axis X and the pivotal axis parallel to the axis Y, the configuration in which the pivotal axis Ry parallel to the axis Y is the pivotal axis passing through the center of the light combiner 456 can be simplified, and the assembly of the attitude adjustment apparatus 5 can be simplified.

Since the range over which the image formation unit is moved in the pivotal motion around the pivotal axis Rx is smaller than the range over which the image formation unit FU is moved in the pivotal motion around the pivotal axis Ry as described above, the configuration in which the pivotal axis Rx is shifted from the center of the light combiner 456 toward the projection optical apparatus 46 does not greatly change the range over which the image formation unit FU is moved.

Further, since the pivotal axis Rx is so set as to be shifted from the light combiner 456 (in detail, center of light combiner 456) toward the projection optical apparatus 46, and the pivotal axis Rx therefore does not necessarily need to pass through the center of the light combiner 456, the configuration of the pitch pivotal motion section 7, which supports the yaw pivotal motion section 6, can be simplified, and the pitch pivotal motion section 7 can be readily disposed. The configuration and assembly of the attitude adjustment apparatus 5 can therefore be simplified.

In a case where dust having entered the interior of the projector 1 adheres to the image formation unit FU, a shadow of the dust appears in or otherwise interferes with an image formed by the image formation unit FU, so that the image deteriorates, and the dust is so heated that the temperature of the image formation unit FU locally increases and other factors thereof deteriorate, resulting in accelerated degradation of the image formation unit FU. The same holds true for other optical parts to which the dust adheres.

On the other hand, a gap according to the amount of pivotal motion of the frame 71 needs to be provided between the frame 71 and the support member 8, and the dust having entered the projector 1 could further enter the space where the image formation unit FU is disposed through the gap.

To eliminate the concern described above, in the attitude adjustment apparatus 5, the pitch pivotal motion section 7 includes not only the frame 71 described above, which supports the yaw pivotal motion section 6, but the pivotal motion mechanism 72, which causes the frame 71 to pivot, and the sealing member 74, which seals the gap between the frame 71 and the support member 8. The configuration described above can prevent the dust from entering the space where the image formation unit FU is disposed through the gap. Deterioration of an image and degradation of parts can therefore be avoided.

The yaw pivotal motion section 6 includes the motor 624, which serves as the driver that produces drive force that causes the image formation unit FU to pivot, the worm gear 625, which serves as the pivotal motion apparatus that is driven by the motor 624 to cause the image formation unit FU to pivot around the pivotal axis Ry, the lead screw 626, the worm wheel 627, and the pivotal motion member 635.

The pitch pivotal motion section 7 includes the motor 724, which similarly serves as the driver, the worm gear 725, which serves as the pivotal motion apparatus that is driven by the motor 724 to cause the image formation unit FU to pivot around the pivotal axis Rx, the lead screw 726, the worm wheel 727, and the frame 71.

According to the configuration described above, the motors 624 and 724 can be driven to cause the attitude adjustment apparatus 5 to adjust the attitude of the image formation unit FU not only during the assembly of the projector 1 but even after the shipment of the projector 1. Further, fine adjustment of the image formation unit FU can be made, as compared with a case where the attitude adjustment is manually performed.

In the yaw pivotal motion section 6, which forms the attitude adjustment apparatus 5, the pivotal motion member 635, which pivots integrally with the light combiner 456, includes the shaft section 6352, which serves as the pivotal axis Ry. Further, the shaft section 6352 is urged by the urging member 636X (first urging member) and the urging member 636Z (second urging member) against part of the inner surfaces of the opening 6212, which is formed in the first holding member 621 and into which the shaft section 6352 is inserted, the inner surface 6213, which intersects the +X direction, and the inner surface 6214, which intersects the +Z direction. The shaft section 6352 is thus urged against the inner surfaces 6213 and 6214, which are flat surfaces that intersect each other, and positioned there. The inclination and play of the shaft section 6352 can therefore be avoided, whereby the attitude of the image formation unit FU can be stably adjusted. The shaft section 6112, which serves as the pivotal axis Ry, the urging members 613 (613X and 613Z), and the inner surfaces 6125 and 6126 can also provide the same effect.

The shaft section 6352 is provided with the urged member 6353, which has the abutment surface 6354 (first surface), which is located on the side opposite the inner surface 6213 with respect to the shaft section 6352 and pressed by the urging member 636X, and the abutment surface 6355 (second surface), which is located on the side opposite the inner surface 6214 with respect to the shaft section 6352 and pressed by the urging member 636Z. The urging members 636X and 636Z, which are each a coil spring, can therefore urge the shaft section 6352 against the inner surfaces 6213 and 6214. The simple configuration described above therefore allows the positioning of the shaft section 6352. The same holds true for the shaft section 6112 and the urged member 6113.

The engagement section 6357 of the pivotal motion member 635, which pivots integrally with the light combiner 456, which forms the image formation unit FU described above, engages with the lead screw 626 in the portion ST2, which is opposite the shaft section 6352 (pivotal axis Ry) with respect to the lead screw 626. The amount of pivotal motion (angle of pivotal motion) of the pivotal motion member 635 can therefore be smaller than the amount of pivotal motion of the lead screw 626, as compared with the case where the engagement section 6357 engages with the lead screw 626 in the portion ST1 facing the shaft section 6352 (pivotal axis Ry) with respect to the lead screw 626. Fine adjustment of the amount of pivotal motion of the light combiner 456, which is the pivotal motion target, and hence the image formation unit FU can therefore be made. Further, since the lead screw 626 and the engagement section 6357 can therefore be so positioned as to be close to the pivotal axis Ry, the size of the attitude adjustment apparatus 5 and hence the size of the projector 1 can be reduced.

The lead screw 626 has the helical groove 6261 formed along the outer circumference thereof. The engagement section 6357 has the teeth 6359, which engage with the helical groove 6261, and the teeth 6359 are located on the side opposite the shaft section 6352 (pivotal axis Ry) with respect to the lead screw 626. The portion of the engagement section 6357 that engages with the lead screw 626 can therefore be set in the portion ST2 described above.

The engagement section 6357 is so shaped as to surround the outer circumference of the lead screw 626. The shape of the engagement section 6357 can prevent the engagement section 6357 from disengaging from the lead screw 626 due to some cause. The engagement section 6357 can therefore engage with the lead screw 626.

The pivotal motion driver 62, which is provided in the yaw pivotal motion section 6 of the attitude adjustment apparatus 5, includes the first pulley 628, the timing belt 629, the second pulley 631, the shaft member 632, the photosensor 633, and the potentiometer 634 as well as the lead screw 626 and the pivotal motion member 635 described above. Out of the components described above, the first pulley 628 is integrated with the lead screw 626, and the shaft member 632, with which the second pulley 631 is integrated, is so disposed that the axis of rotation of the shaft member 632 is parallel to the lead screw 626. The timing belt 629 as the transmission member transmits the rotation of the first pulley 628 to the second pulley 631 (and hence shaft member 632), and the photosensor 633 and the potentiometer 634 as the pivotal motion detection section detect the pivotal motion of the shaft member 632 and hence the pivotal motion of the image formation unit FU. In the thus configured pivotal motion driver 62, the pivotal motion of the lead screw 626 is transmitted to the shaft member 632 via the first pulley 628, the timing belt 629, and the second pulley 631, and the pivotal motion of the shaft member 632 is detected with the photosensor 633 and the potentiometer 634. The amount of pivotal motion of the lead screw 626 can therefore be detected with the photosensor 633 and the potentiometer 634 so positioned as to be separate from the lead screw 626. Therefore, the photosensor 633 and the potentiometer 634 can be arranged with improved flexibility, and the photosensor 633 and the potentiometer 634 can be so disposed as not to interfere with the pivotal motion member 635 or the image formation unit FU.

The pitch pivotal motion section 7, which has the same configuration as that of the pivotal motion driver 62, can also provide the same effects described above.

The second pulley 631 increases the speed of the pivotal motion transmitted from the first pulley 628 via the timing belt 629. The shaft member 632 provided with the second pulley 631 therefore pivots by a greater amount than the first pulley 628. The amount of pivotal motion of the shaft member 632 can therefore be readily detected with the potentiometer 634, whereby the amount of pivotal motion of the lead screw 626 and hence the amount of pivotal motion (angle of pivotal motion) of the pivotal motion member 635 and the image formation unit FU can be detected with increased accuracy. Fine detection of the amount of pivotal motion of the light combiner 456, which is the pivotal motion target, can therefore be performed.

The pitch pivotal motion section 7, which has the same configuration as that of the pivotal motion driver 62, can also provide the same effects described above.

The pivotal motion driver 62 includes, as the pivotal motion detection section, the potentiometer 634, which engages with the shaft member 632 and detects the amount of pivotal motion of the shaft member 632, and the photosensor 633, which can be blocked by the light blocker 6321 described above in accordance with the pivotal motion of the shaft member 632. The amount of pivotal motion (angle of pivotal motion) of the pivotal motion member 635 and hence the light combiner 456 (image formation unit FU) can be detected based on the result of the detection performed by the potentiometer 634. Further, the light combiner 456 (image formation unit) is allowed to return to the original position with precision based on the result of the detection performed by the photosensor 633, which has high detection accuracy.

The pitch pivotal motion section 7, which has the same configuration as that of the pivotal motion driver 62, can also provide the same effects described above.

The pivotal motion driver 62 includes not only the timing belt 629 as the transmission member but the tensioner 630, which presses the timing belt 629 to prevent slack of the timing belt 629, as described above. The pivotal motion of the first pulley 628 can therefore be transmitted to the second pulley 631 and hence the shaft member 632 with no loss of the pivotal motion. Detection of the amount of pivotal motion of the shaft member 632 therefore allows accurate detection of the amount of pivotal motion of the lead screw 626 and hence the image formation unit FU.

Second Embodiment

A second embodiment of the invention will next be described.

A projector according to the present embodiment has the same configuration as that of the projector 1 described above but differs therefrom in that the pivotal axis Rx extending in the +X direction is so set as to connect the centers of the image formation areas of the light modulators 452B and 452R to each other. In the following description, the same or roughly the same portions as those having been already described have the same reference characters and will not be described.

Figure 25:
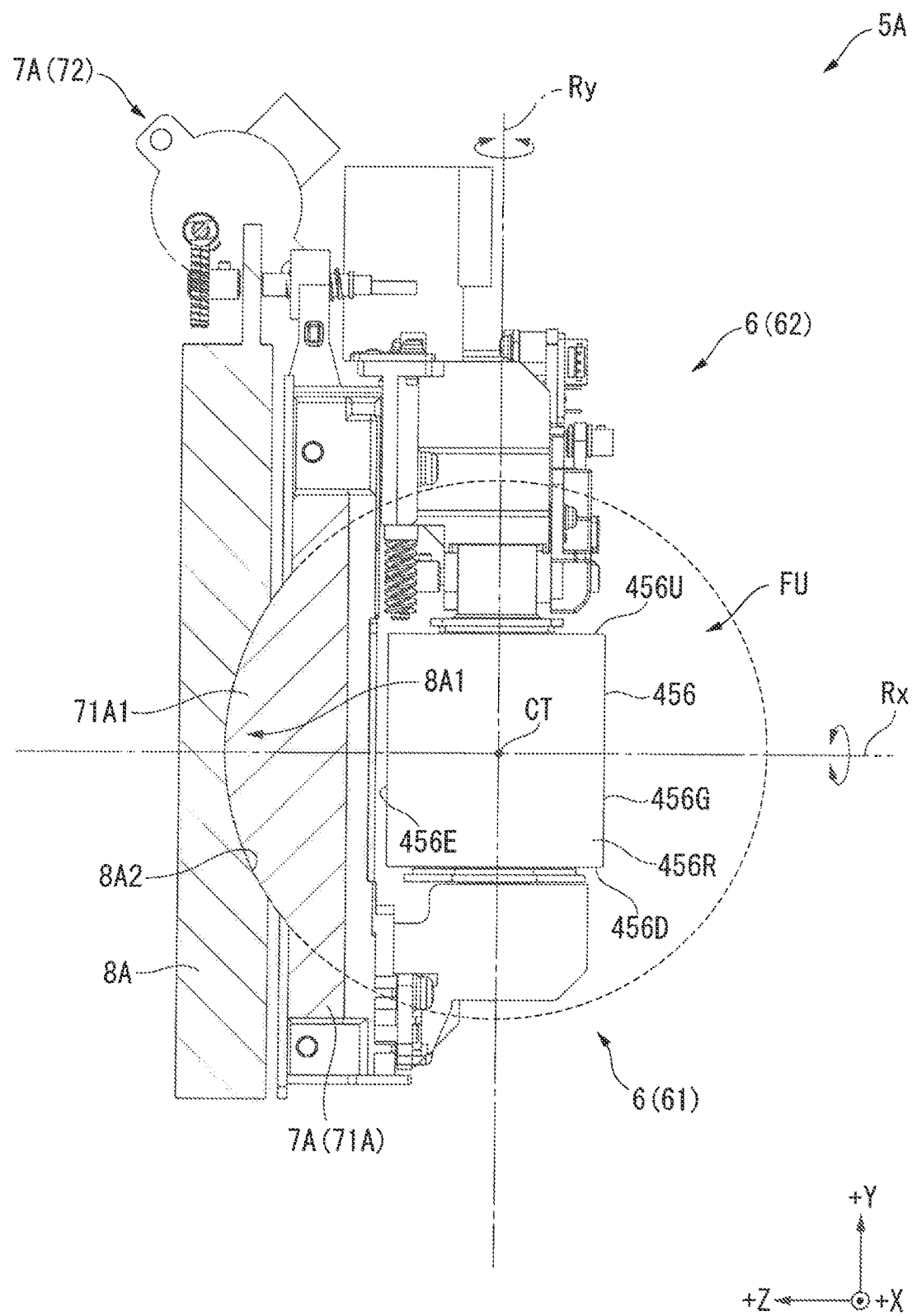
FIG. 25 is a cross-sectional view showing an attitude adjustment apparatus provided in a projector according to a second embodiment of the invention.

FIG. 25 is a cross-sectional view of an attitude adjustment apparatus 5A and the light combiner 456 provided in the projector according to the present embodiment and viewed from the +X-direction side (cross-sectional view taken along XZ plane). In FIG. 25, part of the attitude adjustment apparatus 5A is omitted.

The projector according to the present embodiment has the same configuration and function as those of the projector 1 described above except that the attitude adjustment apparatus 5 is replaced with the attitude adjustment apparatus 5A.

The attitude adjustment apparatus 5A has the same configuration and function as those of the attitude adjustment apparatus 5 described above except that the pitch pivotal motion section 7 and a support member 8 are replaced with a pitch pivotal motion section 7A and a support member 8A, as shown in FIG. 25. That is, the attitude adjustment apparatus 5A includes the yaw pivotal motion section 6, the pitch pivotal motion section 7A, and the support member 8A.

The pitch pivotal motion section 7A is an X pivotal motion section that supports the yaw pivotal motion section 6 and the image formation unit FU and causes the yaw pivotal motion section 6 and the image formation unit FU to pivot around the pivotal axis Rx extending in the +X direction, and the pitch pivotal motion section 7A corresponds to the first pivotal motion section, as in the case of the pitch pivotal motion section 7. The pitch pivotal motion section 7A includes a frame 71A, the pivotal motion mechanism 72, and the sealing member (which is not shown in FIG. 25).

The frame 71A supports the yaw pivotal motion section 6 and is caused to pivot by the pivotal motion mechanism 72 around the pivotal axis Rx, as in the case of the frame 71 described above. The frame 71A has the same configuration and function as those of the frame 71 except that the shaft sections 714 and 715 are replaced with a slide section 71A1.

The slide section 71A1 is a portion that arcuately protrudes when viewed from the +X-direction side and slides along a guide section 8A1 provided as part of the support member 8A.

The support member 8A supports not only the pivotal motion mechanism 72 but the frame 71A pivotably around the pivotal axis Rx, as does the support member 8 described above. The support member 8A has the same configuration as that of the support member 8 and further includes the guide section 8A1.

The guide section 8A1 is a recess into which the slide section 71A1 described above is inserted and a portion that guides the sliding motion of the slide section 71A1 to cause the frame 71A to pivot. That is, the guide section 8A1 defines the pivotal axis which extends in the +X direction and around which the frame 71A pivots. The guide section 8A1 has a guide surface 8A2 (bottom of recess), against which the slide section 71A1 abuts and which is formed in an arcuate shape according to the arcuate shape of the slide section 71A1.

A center CT, which is the center of the arc that forms the shape of the slide section 71A1 and is also the center of the arc of the guide surface 8A2, against which the slide section 71A1 abuts, is set on the axis X passing through the center of the light combiner 456 (which is not only optical center but physical center thereof). In other words, the center CT is set at the intersection of the axis that connects the centers of the image formation areas (image formation areas of liquid crystal panels 454) that are the modulation areas of the light modulators 452B and 452R (see FIGS. 2 and 3) and the axis passing through the center of the modulation area of the light modulator 452G and parallel to the optical axis of the projection optical apparatus 46.

The pivotal axis Rx parallel to the axis X, that is, the pivotal axis Rx of the image formation unit FU is therefore so set as to connect the centers of image formation areas of the light modulators 452B and 452R. The pivotal axis Ry, around which the image formation unit FU pivots and which is parallel to the axis Y, is defined by the shaft sections 6112 and 6352 of the yaw pivotal motion section 6, and the pivotal axis Ry is an axis passing through the center of the light combiner 456, as described above.

The projector according to the present embodiment described above can provide the following effects as well as the same effects as those provided by the projector 1 described above.

The pivotal axis Rx is so set as to pass the center of the image formation area (modulation area) of the light modulator 452B and the center of the image formation area (modulation area) of the light modulator 452R. That is, the pivotal axis Rx passes through the optical center of the light combiner 456. Therefore, not only can the amount of pivotal motion of the image formation unit FU be reduced, as in the case of the pivotal axis Ry described above, but the light outputted from the light source apparatus 41 can be used at increased efficiency, and occurrence of light leakage can be avoided.

Variations of Embodiment

The invention is not limited to the embodiments described above, and variations, improvements, and other modifications to the extent that the advantage of the invention is achieved fall within the scope of the invention.

In the embodiments described above, the attitude adjustment apparatus 5 and 5A include the pitch pivotal motion sections 7 and 7A, which cause the image formation unit FU to pivot around the pivotal axis Rx parallel to the axis X, and the yaw pivotal motion section 6, which causes the image formation unit FU to pivot around the pivotal axis Ry parallel to the axis Y, but not necessarily. The attitude adjustment apparatus only needs to cause the image formation unit FU to pivot around a pivotal axis parallel to at least one of the axes X and Y. That is, the attitude adjustment apparatus 5 and 5A may instead include a holding member that holds the image formation unit FU in place of the yaw pivotal motion section 6 or may include a holding member that holds the yaw pivotal motion section 6 in place of the pitch pivotal motion sections 7 and 7A. Further, the configurations of the yaw pivotal motion section 6 and the pitch pivotal motion sections 7 and 7A are not necessarily employed, and the attitude adjustment apparatus may have any other configuration that allows the image formation unit FU to pivot around the pivotal axes Rx and Ry.

The pivotal axis Rx parallel to the axis X may not be so set as to pass through the centers of the image formation areas (modulation areas) of the light modulators 452B and 452R, unlike the pivotal axis Rx employed by the attitude adjustment apparatus 5. Similarly, the pivotal axis Ry parallel to the axis Y may not be so set as to pass the intersection of the axis passing through the centers of the image formation areas of the light modulators 452B and 452R and the axis passing through the center of the image formation area of the light modulator 452G and parallel to the optical axis of the projection optical apparatus 46. That is, the pivotal axis Ry may not be so set as to coincide with the intersection line of the two dielectric multilayer films described above in the cross dichroic prism, which forms the light combiner 456. The light combiner 456 is therefore not necessarily configured to include a cross dichroic prism.

On the other hand, the configuration that allows the pivotal axis Rx to be so set as to pass through the centers of the image formation areas (modulation areas) of the light modulators 452B and 452R is not limited to the configuration shown in the second embodiment described above and may instead be a different configuration.

Further, the pivotal axis Rx may not be completely parallel to the axis X, and the pivotal axis Ry may not be completely parallel to the axis Y.

In the embodiments described above, the yaw pivotal motion section 6 causes the image formation unit FU to pivot around the pivotal axis Ry, and the pitch pivotal motion sections 7 and 7A cause the image formation unit FU to pivot around the pivotal axis Rx, but not necessarily, and the yaw pivotal motion section 6 may cause the image formation unit FU to pivot around the pivotal axis Rx, and the pitch pivotal motion sections 7 and 7A may cause the image formation unit FU to pivot around the pivotal axis Ry. That is, the pivotal motion section that causes the image formation unit FU to pivot around the pivotal axis Ry may be configured to support the pivotal motion section that causes the image formation unit FU to pivot around the pivotal axis Rx. Further, the pivotal motion sections may be provided independently of each other.

In the embodiments described above, the yaw pivotal motion section 6 and the pitch pivotal motion sections 7 and 7A include the motors 624 and 724, which are each driven in accordance with a control signal inputted from the controller, but not necessarily, and at least any of the yaw pivotal motion section 6 and the pitch pivotal motion sections 7 and 7A may be configured to cause the image formation unit FU to pivot manually by a user or any other adjuster. In this case, for example, the motors 624 and 724 may be replaced with a dial, and part of the dial may be exposed to the exterior of the exterior enclosure 2. Each of the motors 624 and 625 is not limited to a stepper motor and may be an actuator having a different configuration.

In the embodiments described above, the pitch pivotal motion sections 7 and 7A include the sealing member 74, which seals the gap formed between the frames 71, 71A and the support member 8, but not necessarily, and the sealing member 74 may be omitted. Further, the shape of the sealing member 74 is not limited to a specific shape and may be any shape that can prevent entry of dust through the gap. The material of the sealing member 74 is also not limited to a specific material and may be any material that prevents entry of dust and is elastic enough to allow the frames 71 and 71A to pivot without difficulty.

In the embodiments described above, the urging members 636X and 636Z press and urge the urged member 6353 provided as part of the shaft section 6352 to cause the shaft section 6352 to abut against the inner surfaces 6213 and 6214, which intersect each other, and urge the shaft section 6352 against the inner surfaces 6213 and 6214 so that the shaft section 6352 is positioned there, but not necessarily, and the urging members 636X and 636Z may directly press and urge the shaft section 6352 to position the shaft section 6352 on the inner surfaces 6213 and 6214.

The urging members 636X and 636Z may differ from each other in terms of the position in the +Y direction. In this case, a flat surface against which the shaft section 6342 abuts can be so located as to face the direction in which the urging force produced by the urging member 636X acts, and another flat surface against which the shaft section 6342 abuts can be so located as to face the direction in which the urging force produced by the urging member 636Z acts. In this case, the shaft section 6352 will not receive rotational moment resulting from the fact that the points where the urging forces act differ in the +Y direction from the points on the flat surfaces against which the shaft section 6352 abuts.

The same holds true for the shaft section 6112 provided in the pivotal motion support section 61, the urged member 6113 provided in association with the shaft section 6112, and the urging members 613X and 613Z, which press and urge the urged member 6113 to urge the shaft section 6112 toward the inner surfaces 6125 and 6126 of the opening 6124.

In the embodiments described above, out of the pivotal motion support section 61 and the pivotal motion driver 62, which form the yaw pivotal motion section 6, the pivotal motion support section 61, which is located on the −Y-direction side of the light combiner 456, includes the pivotal motion member 611 having the shaft section 6112, and the pivotal motion driver 62, which is located on the +Y-direction side of the light combiner 456, includes the pivotal motion member 635 having the shaft section 6352, but not necessarily. The pivotal motion support section may not necessarily include the shaft section 6112 as long as the pivotal motion support section can support the light combiner 456 pivotably around the pivotal axis Ry extending in the +Y direction.

Further, in the embodiments described above, the pivotal motion driver 62, which is located on the +Y-direction side of the light combiner 456, causes the image formation unit FU to pivot, but not necessarily, and the pivotal motion driver 62 may be located on the −Y-direction side of the light combiner 456. Similarly, the pivotal motion mechanism 72, which forms the pitch pivotal motion sections 7 and 7A, is not necessarily located on the +Y-direction side of the image formation unit FU and my instead be located on the −Y-direction side thereof. Further, the pivotal motion mechanism 72 may be located on the +X-direction side or −X-direction side of the image formation unit FU.

In the embodiments described above, a coil spring is employed as each of the urging members 613 (613X and 613Z), 636 (636X and 636Z), 637, 638, BMX, BMY, and BMZ, which each urge a target to be urged, but not necessarily. Another member that allows predetermined urging force to act on a target to be urged may be employed as any of the urging members. For example, a leaf spring, a resin spring, or an elastic element may be employed as any of the urging members.

In the embodiments described above, to set the portion that engages with the lead screw 626 in the portion ST2 opposite the shaft section 6352, which serves as the pivotal axis Ry, with respect to the lead screw 626, the teeth 6359, which engages with the helical groove 6261, are formed in the portion ST2 but not in the portion ST1 facing the shaft section 6352 with respect to the lead screw 626, but not necessarily. As long as the portion of the engagement section 6357 that engages with the lead screw 626 can be set in a portion opposite the pivotal axis Ry with respect to the lead screw 626, the configuration of each of the engagement section and the lead screw may be a different configuration.

For example, the portion of the quadrangular tubular engagement section 6357 that faces the shaft section 6352 (pivotal axis Ry) may be cut off. That is, the engagement section 6357 may be formed in a roughly U-letter shape that opens toward the shaft section 6352 when viewed in the +Z direction, and the teeth 6359 may be located in the inner side of the roughly U-letter shape. The shape of the engagement section 6357 may therefore not need to be a roughly quadrangular shape and may be a circular columnar shape, a semicircular columnar (arcuate columnar) shape, or a semi-rectangular columnar shape.

Further, for example, when the lead screw 626 and the engagement section 6357 are viewed along the center axis of the lead screw 626, the center of the lead screw 626 may be shifted toward the side opposite the pivotal axis Ry with respect to the center of the opening of the engagement section 6357 into which the lead screw 626 is inserted. In this case, the lead screw 626 is allowed to come into contact with the portion ST2 of the engagement section 6357, which is farther from the pivotal axis Ry, whereby the lead screw 626 is allowed to engage with the teeth 6359 located in the portion ST2.

Further, in this case, an urging member that urges the lead screw 626 in the direction in which the lead screw 626 moves away from the pivotal axis Ry (direction in which lead screw 626 approaches portion ST2) may be provided, or an urging member that urges the engagement section 6357 toward the pivotal axis Ry may be provided.

These configurations may be combined with any of the configurations described above.

In the embodiments described above, the pivotal motion driver 62, which forms the yaw pivotal motion section 6 of the attitude adjustment apparatus 5 and 5A, includes not only the lead screw 626 and the pivotal motion member 635 but the first pulley 628, the timing belt 629, the second pulley 631, the shaft member 632, the photosensor 633, and the potentiometer 634. Similarly, the pitch pivotal motion sections 7 and 7A include not only the frames 71 and 71A and the lead screw 726 but the first pulley 728, the timing belt 729, the second pulley 731, the shaft member 732, the photosensor 733, and the potentiometer 734. The photosensors 633 and 733 and the potentiometers 634 and 734 detect the pivotal motion of the shaft members 632 and 732 to detect the amount of pivotal motion (angle of pivotal motion) and the current position of the light combiner 456 (and hence image formation unit FU), but not necessarily. The pivotal motion detection section, such as the photosensor and the potentiometer, may directly detect the amount of pivotal motion of the lead screws 626 and 726 or may directly detect the amount of pivotal motion and the angle of pivotal motion of the light combiner 456 and the image formation unit FU. Further, the configuration in which the photosensor and the potentiometer are provided is not necessarily employed, and a configuration in which one of the photosensor and the potentiometer is provided may be employed.

In the embodiments described above, the second pulleys 631 and 731 increase the speed of the pivotal motion of the first pulleys 628 and 728, but not necessarily, and the second pulleys 631 and 731 may not increase the speed of the pivotal motion. Further, another pulley may be provided between the first and second pulleys, and the pivotal motion of the first pulley may be transmitted to the second pulley via the other pulley.

In the embodiments described above, the attitude adjustment apparatus 5 and 5A include the photosensors 633 and 733 and the potentiometers 634 and 734, which detect the pivotal motion of the shaft members 632 and 732, as the pivotal motion detection section that detects the amount of pivotal motion (angle of pivotal motion) of the light combiner 456 (image formation unit FU), but not necessarily. The pivotal motion detection section may be configured to detect the amount of pivotal motion and the angle of pivotal motion of the light combiner 456 (image formation unit FU), for example, with a different sensor.

Further, for example, the linkage member 612 or the first holding member 621 may include a detection section that detects the amount of pivotal motion and the angle of pivotal motion of the pivotal motion members 611 and 635, or the support member 8 may include a detection section that detects the amount of pivotal motion and the angle of pivotal motion of the frame 71.

In the embodiments described above, the yaw pivotal motion section 6 of the attitude adjustment apparatus 5 and 5A includes the timing belt 629, which serves as the transmission member that transmits the pivotal motion of the first pulley 628 to the second pulley 631, and the tensioner 630, which presses the timing belt 629, but not necessarily. That is, the transmission member may be a component other than the timing belt 629, for example, may be a chain. Further, the tensioner 630 may not necessarily be provided, and a different component that can prevent slack of the timing belt or any other transmission member may be employed.

The same holds true for the timing belt 729 and the tensioner 730 provided in the pitch pivotal motion sections 7 and 7A.

In the embodiments described above, the attitude adjustment apparatus 5 and 5A include the pitch pivotal motion sections 7 and 7A, which cause the image formation unit FU to pivot around the pivotal axis Rx parallel to the +X direction (axis X), and the yaw pivotal motion section 6, which causes the image formation unit FU to pivot around the pivotal axis Ry parallel to the +Y direction (axis Y) perpendicular to the +X direction, but not necessarily. The attitude adjustment apparatus may instead cause the image formation unit FU to pivot around at least one of the pivotal axes Rx and Ry. Further, the pivotal axis of the image formation unit FU may not be parallel to the +X or +Y direction.

In the embodiments described above, the projector 1 includes the three light modulators 452 (452B, 452G, and 452R), but not necessarily. The invention is also applicable to a projector including at least two light modulators and a light combiner that combines the light fluxes outputted from the light modulators.

In the embodiments described above, the image projection apparatus 4 has the configuration in which the optical parts described above are disposed in the positions shown in FIG. 1, but not necessarily, and the optical parts that form the image projection apparatus 4 and the layout of the optical parts can be changed as appropriate.

In the embodiments described above, the light modulators 452 each include the transmissive liquid crystal panel 454 having a light incident surface and a light exiting surface separate from each other, but not necessarily, and may instead each include a reflective liquid crystal panel having a single surface that serves as both the light incident surface and the light exiting surface. Further, a light modulator using any component other than a liquid-crystal-based component and capable of modulating an incident light flux to form an image according to image information, such as a device using micromirrors, for example, a DMD (digital micromirror device), may be employed. In this case, the projector 1 shown in the first embodiment and the projector shown in the second embodiment may employ three light modulators each formed of a DMD in place of the three light modulators 452 described above.

The attitude adjustment apparatus 5 and 5A cause the image formation unit FU, in which the three light modulators 452 are integrated with one light combiner 456, to pivot around the pivotal axes Rx and Ry described above to adjust the attitude of each of the light modulators 452, but not necessarily, and the attitude adjustment apparatus may be configured to directly adjust the attitude of each of the light modulators. To this end, in the case where the image formation apparatus 45 includes the three light modulators 452, as in the case of the projector 1 described above, the attitude of the three light modulators 452 may be adjusted together, or the attitude of each of the three light modulators 452 may be separately adjusted. The same holds true for the case where the liquid crystal panels described above are employed as the light modulators and the case where the DMDs described above are employed as the light modulators.

Further, the image formation apparatus 45 may include no light combiner but may include one light modulator. In this case, the attitude adjustment apparatus may be configured to adjust the attitude of the one light modulator. The same holds true for the case where the liquid crystal panel described above is employed as the light modulator and the case where the DMD described above is employed as the light modulator.

The entire disclosure of Japanese Patent Application No. 2017-189826, filed on Sep. 29, 2017 and Japanese Patent Application No. 2017-189827, filed on Sep. 29, 2017 are expressly incorporated by reference herein.

What is claimed is:

1. A projector comprising:
a light source apparatus;
an image formation apparatus that includes a light modulator and forms an image, the light modulator modulating light outputted from the light source apparatus;
a projection optical apparatus that projects the image formed by the image formation apparatus; and
an attitude adjustment apparatus that causes the light modulator to pivot around a pivotal axis perpendicular to an optical axis of the projection optical apparatus to adjust an attitude of the light modulator, wherein:
the image formation apparatus includes
a plurality of the light modulators, and
a light combiner that is integrated with the plurality of the light modulators and combines light fluxes incident from the plurality of the light modulators with one another,
the attitude adjustment apparatus causes the light combiner to pivot around the pivotal axis to adjust the attitudes of the plurality of the light modulators,
the light combiner has
a first light incident surface and a second light incident surface located on opposite sides of the light combiner,
a third light incident surface that intersects the first and second light incident surfaces, and
a light exiting surface which is located on a side opposite the third light incident surface with respect to the light combiner and through which combined light exits, the combined light being a combination of first light incident on the first light incident surface, second light incident on the second light incident surface, and third light incident on the third light incident surface,
the plurality of the light modulators include
a first light modulator that faces the first light incident surface, modulates the first light, and outputs the modulated first light to the first light incident surface,
a second light modulator that faces the second light incident surface, modulates the second light, and outputs the modulated second light to the second light incident surface, and
a third light modulator that faces the third light incident surface, modulates the third light, and outputs the modulated third light to the third light incident surface, and
the pivotal axis includes a pivotal axis parallel to one of a first axis that is perpendicular to the optical axis and passes through centers of modulation areas of the first and second light modulators and a second axis that is perpendicular to the optical axis and perpendicular to the first axis.

2. The projector according to claim 1, wherein
the pivotal axis includes a pivotal axis that is parallel to the second axis and passes through an intersection of the first axis and an axis passing through a center of a modulation area of the third light modulator and parallel to the optical axis.

3. The projector according to claim 1, wherein
the attitude adjustment apparatus includes
a first pivotal motion section that causes the light combiner to pivot around the pivotal axis that is a pivotal axis parallel to the first axis, and
a second pivotal motion section that causes the light combiner to pivot around the pivotal axis that is a pivotal axis parallel to the second axis.

4. The projector according to claim 3, wherein
the second pivotal motion section causes the light combiner to pivot around a pivotal axis that passes through an intersection of the first axis and an axis passing through a center of a modulation area of the third light modulator and parallel to the optical axis, and
the first pivotal motion section supports the second pivotal motion section and causes the second pivotal motion section to pivot to cause the light combiner to pivot.

5. The projector according to claim 4, wherein
the pivotal axis of the first pivotal motion section is so set as to be shifted from the light combiner toward the projection optical apparatus.

6. The projector according to claim 4, wherein
the attitude adjustment apparatus includes a support member that supports the first pivotal motion section, and
the first pivotal motion section includes
a frame that supports the second pivotal motion section,
a pivotal motion mechanism that causes the frame to pivot, and
a sealing member that seals a gap between the frame and the support member.

7. The projector according to claim 3, wherein
at least one of the first and second pivotal motion sections includes
a driver that produces drive force that causes the light combiner to pivot, and
a pivotal motion apparatus that is driven by the driver to cause the light combiner to pivot.

8. A projector comprising:
a light source apparatus;
an image formation apparatus that includes a light modulator and forms an image, the light modulator modulating light outputted from the light source apparatus;
a projection optical apparatus that projects the image formed by the image formation apparatus; and
an attitude adjustment apparatus that causes the light modulator to pivot around a pivotal axis perpendicular to an optical axis of the projection optical apparatus to adjust an attitude of the light modulator, wherein:

the image formation apparatus includes
a plurality of the light modulators, and
a light combiner that is integrated with the plurality of the light modulators and combines light fluxes incident from the plurality of the light modulators with one another,
the attitude adjustment apparatus causes the light combiner to pivot around the pivotal axis to adjust the attitudes of the plurality of the light modulators, and
the attitude adjustment apparatus includes
a pivotal motion member that includes a shaft section that serves as the pivotal axis and pivots integrally with the light combiner,
a first positioning surface that is a flat surface that intersects one of two directions perpendicular to the pivotal axis and perpendicular to each other,
a second positioning surface that is a flat surface that intersects another of the two directions,
a first urging member that urges the shaft section against the first positioning surface, and
a second urging member that urges the shaft section against the second positioning surface.

9. The projector according to claim 8, wherein
the attitude adjustment apparatus includes an urged member provided as part of the shaft section, and
the urged member has
a first surface that is located on a side opposite the first positioning surface with respect to the shaft section and pressed by the first urging member, and
a second surface that is located on a side opposite the second positioning surface with respect to the shaft section and pressed by the second urging member.

10. A projector comprising:
a light source apparatus;
an image formation apparatus that includes a light modulator and forms an image, the light modulator modulating light outputted from the light source apparatus;
a projection optical apparatus that projects the image formed by the image formation apparatus; and
an attitude adjustment apparatus that causes the light modulator to pivot around a pivotal axis perpendicular to an optical axis of the projection optical apparatus to adjust an attitude of the light modulator, wherein:
the image formation apparatus includes
a plurality of the light modulators, and
a light combiner that is integrated with the plurality of the light modulators and combines light fluxes incident from the plurality of the light modulators with one another,
the attitude adjustment apparatus adjusts an attitude of the light combiner to adjust attitudes of the light modulators,
the attitude adjustment apparatus includes
a pivotal motion member provided integrally with the light combiner, and
a pivotal motion apparatus that causes the pivotal motion member to pivot around the pivotal axis to cause the light combiner to pivot along with the pivotal motion member,
the pivotal motion apparatus includes a lead screw having an axis of rotation parallel to an axis perpendicular to the pivotal axis,
the pivotal motion member includes an engagement section that engages with the lead screw, and
the engagement section engages with the lead screw in a portion on a side opposite the pivotal axis with respect to the lead screw.

11. The projector according to claim 10, wherein
the lead screw has a helical groove formed along an outer circumference of the lead screw,
the engagement section has a tooth that engages with the helical groove, and
the tooth is located on a side opposite the pivotal axis with respect to the lead screw.

12. The projector according to claim 10, wherein
the engagement section is so shaped as to surround the lead screw along an outer circumference thereof.

13. The projector according to claim 10, wherein
the attitude adjustment apparatus includes
a first pulley provided integrally with the lead screw,
a shaft member so disposed that an axis of rotation thereof is parallel to the lead screw,
a second pulley provided integrally with the shaft member,
a transmission member that transmits pivotal motion of the first pulley to the second pulley, and
a pivotal motion detection section that detects pivotal motion of the shaft member.

14. The projector according to claim 13, wherein
the second pulley increases a speed of the pivotal motion transmitted by the transmission member from the first pulley.

15. The projector according to claim 13, wherein
the pivotal motion detection section includes at least one of
a potentiometer that engages with the shaft member and detects an amount of pivotal motion of the shaft member, and
a photosensor that is allowed to be blocked by a light blocker provided as part of the shaft member in accordance with the pivotal motion of the shaft member.

16. The projector according to claim 13, wherein
the transmission member is a timing belt, and
the attitude adjustment apparatus includes a tensioner that presses the timing belt to prevent slack of the timing belt.

* * * * *